(12) United States Patent
Patera et al.

(10) Patent No.: US 6,792,108 B1
(45) Date of Patent: Sep. 14, 2004

(54) APERIODIC ENCRYPTION FOR DIGITAL DATA

(75) Inventors: Jiri Patera, Montreal (CA); Edita Pelantova, Prague (CZ); Zuzana Masakova, Prague (CZ)

(73) Assignee: Universite de Montrëal, Montreal (CA)

( * ) Notice: Subject to any disclaimer, the term of this patent is extended or adjusted under 35 U.S.C. 154(b) by 0 days.

(21) Appl. No.: 09/327,633

(22) Filed: Jun. 8, 1999

(51) Int. Cl.[7] .............................. H04L 9/18; H04L 9/28; H04L 9/12
(52) U.S. Cl. .............................. 380/43; 380/28; 380/42; 380/44; 380/259; 382/232
(58) Field of Search .............................. 380/28, 42, 43, 380/44, 259, 260, 261, 262, 274; 713/176; 382/100, 232

(56) References Cited

U.S. PATENT DOCUMENTS

| | | | |
|---|---|---|---|
| 5,835,597 A | 11/1998 | Coppersmith et al. | 380/28 |
| 6,047,088 A * | 4/2000 | van Beek et al. | 382/243 |
| 6,201,881 B1 * | 3/2001 | Masuda et al. | 382/100 |

OTHER PUBLICATIONS

Knuth, D.E., "Deciphering a Linear Congruential Encryption," Jan. 1985, IEEE Trans. Information Theory, vol. 31, No. 1, pp. 49–52.*

Soljanin, E., "A Shannon Theoretic Study of Penrose Tilings," Aug. 21, 1998, Proceedings, 1998 IEEE International Symposium on Information Theory, 1998, p. 78.*

Moody and Patera, Can J. Phys., vol. 72, 1994 "Colourings of quasicrystals" pp. 442–452.

Masakova et al., J. Phys.A. Math. Gen.31 (1998) 1539–1552 "Minimal distances in quasicrystals".

Masakova et al., J. Phys.A. Math. Gen.31 (1998) 1443–1453 "Inflation centres of the cut and project quasicrystals".

Masakova et al., J. Phys.A. Math. Gen.31 (1998) 1–20 "Self–similar Delone sets and quasicrystals"pp. 1–16.

* cited by examiner

*Primary Examiner*—Justin T. Darrow
(74) *Attorney, Agent, or Firm*—Kudirka & Jobse, LLP

(57) ABSTRACT

For stream or block ciphers, a sequence generator using a quasi-crystal function is used to prepare an encryption or decryption pad. Various techniques for generating purely aperiodic sequences using quasi-crystal functions are available, including geometric, algebraic and symbolic substitution. The aperiodic sequence is generated using minimal processing power, and generation may continue for extended periods of time in the case of long messages or extended period encryption of a data transmission channel.

30 Claims, 4 Drawing Sheets

APERIODIC ENCRYPTION FOR DIGITAL DATA

FIELD OF THE INVENTION

The present invention relates to digital data encryption. More particularly, the invention relates to data encryption using very long binary sequences (keystream) generated from a sequence generator using initialization parameters, such as a quasi-crystal generator, as described herein.

BACKGROUND OF THE INVENTION

Some current encryption practices known as stream ciphers are based on the use of a keystream generated from an encryption key and which encrypts plaintext into ciphertext according to an encryption scheme. The most common and simple-to-compute encryption scheme is the exclusive-OR or XOR logic function. In the encryption processor, the ciphertext is generated by XOR'ing the computer-word-size blocks of the plaintext with the corresponding computer-word-size blocks of the keystream. To decrypt the message, the same keystream generated using the same key is XOR'ed with the ciphertext to obtain the original plaintext. If the key space is as large as the plaintext space, in which case the key is used as the keystream, and if there is no repetition of the use of the key, the encryption is considered to be unconditionally secure. This encryption process is called a one-time pad.

In such encryption, both the sender and the receiver must share the key. The transmission of the key must be carried out using a secure channel, or using a secure encryption scheme over an unsecure channel. If the key is very long, the transmission of the key creates greater overhead for the encryption communication. This motivates the design of stream ciphers where the keystream is pseudo-randomly generated from a smaller secret key. Common stream ciphers are based on cryptographically secure pseudo-random bit generators (CSPRBG's).

The use of pseudo-random number generators (PRNG's) to provide a stream cipher is known in the art. According to this technique, the shared secret (short) key represents parameters used in PRNG and a stream is obtained from a sequence of pseudo-random generated numbers. This stream is then used for enciphering the plaintext at the sender's end and deciphering the ciphertext at the receiver's end.

PRNGs are much more computationally efficient than CSPRBG's, however they are not cryptographically secure. PRNG's are periodic, and while their period may be very long, specific patterns of the sequence indicate position in that sequence, and it becomes possible for an attacker having some knowledge of the plaintext to determine the position in the periodic sequence and break the cipher. In some cases, PRNG's are so unsecure that an attacker may obtain directly the type of PRNG used only from looking at a small part of the sequence.

U.S. Pat. No. 5,835,597 to Coppersmith et al. and assigned to IBM describes a software-efficient pseudo-random function which maps an index and an encryption key to a pseudo-random bit string useful for constructing a stream cipher. The method begins by preprocessing the encryption key into a table of pseudo-random values. The index and a set of values from the table is then used to generate a set of initial values for the registers. At least some of the register values are modified in part by taking a current value of a register and replacing the current value with a function of the current value and a value retrieved from the table, the latter value being determined by the values in one or more other registers. After modifying the register values in this fashion, the values are masked using other values from the table and the results then concatenated into the pseudo-random bit string. The modification step is repeated and a new masked function of the register values is then concatenated into the pseudo-random bit string. The modification and concatenation steps are repeated to continue growing the pseudo-random bit string until the string reaches some desired length. The publicly known pseudo-random functions lack true randomness and/or require significant computational effort.

SUMMARY OF THE INVENTION

It is an object of the present invention to provide a method and apparatus for generating very long binary keystreams. This is done in two main steps: first by generating sequences which are aperiodic and simple to compute, and then by coloring selected elements of the sequences, that is attributing binary strings to selected elements of the sequences.

The invention also provides for the use of PRNG's in combination with aperiodic functions, functions which generates a series of values in an unpredictable manner without any periodic repetition of the series. Aperiodic functions, which can be obtained from quasi-crystals, can be used in order to hide all non-randomness in the PRNG's.

The invention provides a method of encrypting data comprising:

a) defining symmetric key parameters specifying at least one quasi-crystal function and a starting point;

b) calculating consecutive aperiodic values of the quasi-crystal function;

c) using the aperiodic values of the quasi-crystal function in a predetermined process of generating a series of encryption pad values, the predetermined process being defined by the key parameters; and d) encrypting the data using the pad values.

The method can be used for encrypting a message to be transmitted, and of course for decrypting an encrypted message received. The invention may be used to provide terminal equipment with modest processing power for carrying out the encryption and description for digital communications.

The invention also provides a method of applying a digital watermark to a selected portion of a document, the selected portion being modifiable without being easily detected, the method comprising:

applying a quasi-crystal transformation to the selected portion of the document;

applying a watermark to the transformed selected portion; and applying an inverse quasi-crystal transformation to the watermarked selected portion. Preferably, the quasi-crystal transformation is a two-dimensional transformation. The watermark applied to the transformed selected portion may comprise a visually identifiable mark.

The encryption method according to the invention has no analog in current cryptographic practice. Its encryption class may be considered to be situated between the one-time-pad method and the stream cipher method with a secret symmetric encryption key. It can be used either for transmission of digital data or as an identification system, allowing a number of hybrid variants and combinations with other encryption types such as block ciphers and watermarks. The encryption system makes use of truly infinite, completely aperiodic point sets (referred to herein as quasi-crystals) which can be generated by a fast algorithm in any dimension from a few real numbers provided in the encryption key. In the one-dimensional case, the points can be taken simply as a discrete set of real numbers, in n-dimensions these are points of an n-dimensional Euclidean space, that is n-tuples of real numbers. The distances between adjacent points along any direction (in n-dimensional quasi-crystal) can take only a small number of distinct values. More information on 2-dimensional quasi-crystals, is given hereinbelow in the description of the watermark embodiment.

The advantage of exploitation of quasi-crystals in comparison with prior art cryptographic methods include:

It can be used for encryption of any type of digital data and of any dimension (for parallel data transmission).

The keystream is derived from quasi-crystal points transformed into a binary form. It can be infinite and aperiodic in the strongest sense: it contains no periodic subsets. Therefore linguistic analysis of the encrypted message is useless: repeated words are encrypted differently: partial knowledge of the content of the encrypted message can be of no help for decryption of the rest of the mesage.

The encryption can be very fast. Quasi-crystals can be generated point by point in real time during the data encryption and decryption, starting from any of its points (seed point). A single quasi-crystal point can be used to encrypt several bits at once.

An encryption (or equivalently enciphering) key is used. It consists of only a few real numbers which determine uniquely all of the infinity of quasi-crystal points and may contain other encryption information as well, such as starting colors. These parameters can be selected by the algorithm specifically for each encryption or can be changed during the encryption according to a prescribed protocol.

There is an infinite number of different quasi-crystals even in one-dimension.

Properties of the keystream may exclude the existence of a mathematical breaking of the encryption without the key.

The method is readily amenable to parallel processing both during encryption and decryption because the same quasi-crystal can be generated from several (many) seed points simultaneously.

The encryption can be made either as a stream cipher or as a block cipher or use to generate digital watermarks.

The novelty of the method consists in systematic use of aperiodic infinite point sets called by several names in the mathematics and physics literature: cut and project sets, model sets, Meyer sets, quasi-crystals, or even quasi-lattices. A lot of properties of such sets are found in the literature (reference may be had to the following: C. Janot, Quasi-crystals: A Primer, Oxford University Press, Oxford, 1994; The Mathematics of Aperiodic Long Range Order, Proc. NATO Advanced Study Institute, Waterloo, Ont. 1995, published by Kluwer Scientific Publishers, ed. R. V. Moody, 1997; and Quasi-crystals and Discrete Mathematics, The Fields Institute Monograph Series, Vol. 10, 1998, American Math. Society, Providence R.I., ed. Jiri Patera). Such quasi-crystal sets have not yet been used before in cryptography. Geometrically, one-dimensional quasi-crystals are constructed as shown in FIG. 1. A two-dimension lattice, for example $Z^2$, is drawn in the plane along with two perpendicular straight lines p and pp with irrational slopes, for example $\tau$ and $\tau'$. Any interval $\Omega=(c,d)$ on the line pp determines a strip in the plane parallel to the line p. The quasi-crystal is formed by the projections of the Lattice points within the strip on to the line p. The interval $\Omega$ is called the acceptance window of the quasi-crystal $\Sigma(\Omega)$. In FIG. 1, the elements of the lattice generating quasi-crystal points are marked by full dots and the projection on the line p is illustrated by segments joining these points and the line p.

The new encryption method according to the present invention makes use of specific properties of quasi-crystals demonstrated in Applicants' recent series of articles: Z. Masakova, Jiri Patera, E. Pelantova, Inflation centers in cut and project quasi-crystals, Jiri Phys. A: Math. Gen., 31 (1998) 1443–1453: Z. Masakova, Jiri Patera, E. Pelantova, Minimal distances in quasi-crystals, J. Phys., A: Math. Gen., 31 (1998) 1539–1552; Z. Masakova, Jiri Patera, . Pelantova, Selfsimilar Delone sets and cut and project quasi-crystals, J. Phys., A: Math. Gen., 31 (1998) 4927–4946. A further paper of interest is the paper given by P. Pleasants, in the Proc. of the 5th Conference on Quasicrystals, Avignon, 1995.

The invention also makes use of the general algebraic 'coloring' scheme of quasi-crystalline points provided in the paper by R. V. Moody, Jiri Pater, Colorings of quasi-crystals, Can. J. Phys. 72 )(1994) 442–452. It is pointed out that the technical results in these papers become possible only after the versatile definition of quasi-crystals introduced in the paper by R. V. Moody, Jiri Patera, Quasi-crystals and icosians, J. Phys. A: Math. Gen., 26 (1993) 2829–2853.

The principal property of the quasi-crystals is the aperiodicity. An other important property is that given any finite quasi-crystal fragment it is impossible to deduce the position of that fragment in the quasi-crystal. The general properties of quasi-crystals, that are exploited according to the present invention, are the following:

a. Quasi-crystals exhibit aperiodicity in the strongest sense. A quasi-crystal contains no periodic subset. There are only a few distinct distances between adjacent points.

b. Quasi-crystals can be generated numerically or symbolically. Numerical implementations are very fast and simple but involve rounding, while symbolical implementations are exact, but may be slower and require more memory. Both types of generation may start with any point of the quasi-crystal. The algorithm involves only a small number of parameters. Distinct parameters lead to generation of distinct quasi-crystals. On a SUN™ computer with 32-bit single processor running at 270 MHz, one can numerically generate well over 1,000,000 quasi-crystal points per second. All these implementation advantages and drawbacks are discussed hereinbelow.

c. The quasi-crystal is deterministic. Its points are completely determined by the parameters of the algorithm: no single point can be added or removed without creating a defect in the quasi-crystal.

d. A finite size fragment of a quasi-crystal does not allow one to identify the quasi-crystal, i.e. to find its other points.

e. There is an infinite number (i.e. cannot be enumerated by the integers) of distinct quasi-crystals in any dimension. Depending on the length of the fragment, the approximate length of the window can be established, but not its position in the quasi-crystal.

f. Quasi-crystal generation may start from any point x in the quasi-crystal.

A summary explanation of the properties of the method according to the invention that achieve the advantages given above are listed below:

A quasi-crystal is a uniformly discrete and relatively dense aperiodic set of points in any dimension. Binary strings are then associated to the points, this is called the coloring of the quasi-crystal. There exists infinitely many ways to color a quasi-crystal. Some coloring prescriptions, which are called admissible algebraic rules, have the property that points of the same color within a quasi-crystal form a subquasi-crystal. The color of a point is determined by its position in the quasi-crystal in any coloring. In the encryption methods, colored quasi-crystal points are used to mask the digital data of any length and of corresponding dimension according to a prescribed encrypting function. Not all colorings lead to cryptographically secure ciphers. In watermarks, colored quasi-crystal points are used to watermark any digitized document. Again, not all coloring leads to secure and robust watermarks.

There is a very fast mathematical algorithm for numerical generation and coloring of the quasi-crystal points starting from any of its points. In the encryption methods, the same algorithm may be used during encryption and decryption.

Since a quasi-crystal contains no periodic subsets and since it is infinite in all directions, repeated words are masked by different sets of points.

An encryption key contains the real numbers which specify: (i) particular quasi-crystals (encryption may involve multiple quasi-crystals as described below); and (ii) the coloring parameters assigning a color to the selected quasi-crystal points. In addition the key may contain other information, namely the encryption function, parameters specifying the subquasi-crystal which determines the position where random points are to be inserted, information for randomization of the encrypted form of the total of data, and others.

The coordinates of quasi-crystal points, hence also their colors, cannot be determined from a finite size fragment of the quasi-crystal without the encryption key. More precisely, any finite quasi-crystal fragment could belong to infinitely many complete quasi-crystals. Moreover, within each such quasi-crystal the fragment is always repeated non periodically and infinitely many times at various positions. In fact repetitions of the fragment within a given quasi-crystal form another quasi-crystal which parameters depend on the fragment.

Quasi-crystal generation and also encryption/decryption can either start from one or from several seed points simultaneously. This follows from the fact that it is possible to generate all quasi-crystals from any of its points, and from the fact that the positions of the points are completely determined by the parameters of the encryption key.

In numerical implementations, theoretical properties of quasi-crystals cannot all be exploited in a direct way, and this for two reasons: finite precision of their arithmetic operations and the practical limits on size of the integers which can be handled in large quantities by computers.

In the present invention, the two sides of the process (transmission, identification, etc.) have secretly selected, using the key, one or several particular quasi-crystals and colorings. In the identification process one side may ask the other to demonstrate its knowledge of some properties of the selected quasi-crystal (a few points in a given position relatively to the seed point, for example).

Another feature of the present invention which enlarges the practical scope of its applicability while imposing only a miniscule computing overhead, is the possible exploitation of coloring of quasi-crystal points during encryption and decryption by a finite number of colors. A color of a point is an integer which is associated to this point. One point may carry more than one color (multiple coloring). It may be advantageous to use algebraic colorings which guarantee that monochromatic subsets of quasi-crystal points are also quasi-crystals. Then one can use points of different colors for different tasks (for example simultaneous transmission of several messages).

BRIEF DESCRIPTION OF THE DRAWINGS

The present invention will be better understood by way of the following detailed description of a presently preferred embodiment of a stream cipher with reference to the appended drawings, in which.

DETAILED DESCRIPTION OF THE PREFERRED EMBODIMENTS

Figure 1:
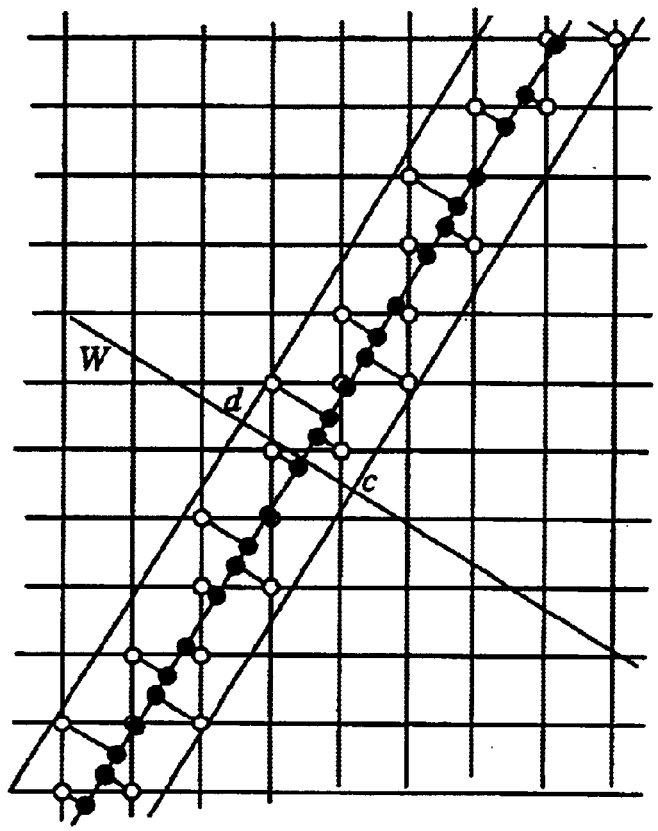
FIG. 1 illustrates the geometrical construction of one-dimensional quasi-crystals as is known in the art.
Figure 2:
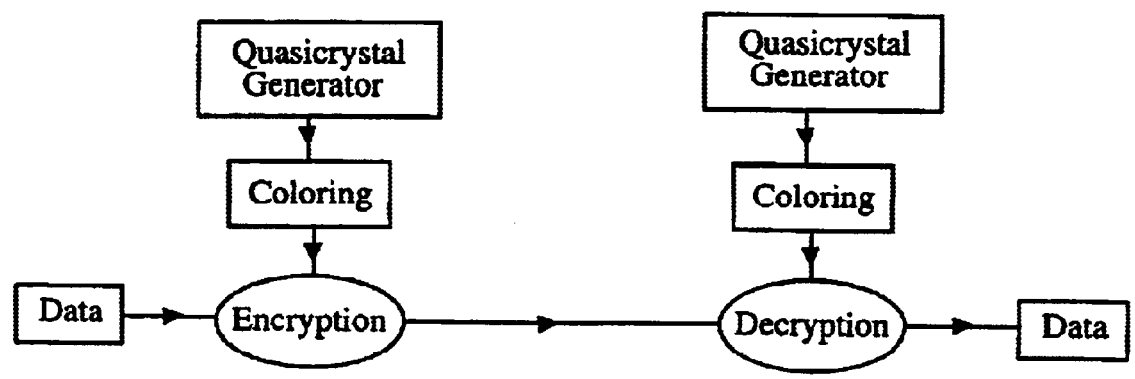
FIG. 2 is a schematic block diagram of a communications system using the Aperiodic Encryption Method (AEM) according to the presently preferred embodiment stream cipher.

Quasi-crystals can be split into families or types according to the irrationality which is built into the coordinates of their points. Any irrationality can be used and the preferred method is geared for algebraic irrationalities. The specific mathematical properties required for the method according to the invention have been determined thus far for quadratic irrationalities only. For other irrationalities, they would have to be worked out first. For example, more than one acceptance window may be used.

In the presently preferred embodiment, only one quasi-crystal is used, the one corresponding to the quadratic irrationality given by the positive solution of the equation $x^2=x+1$. Other quadratic irrationalities can be used in a very similar way (see the paper given by P. Pleasants, in the Proc. of the 5th Conference on Quasicrystals, Avignon, 1995). The first task one faces is to choose the type of quasi-crystals with which to work. The present description of the method uses the irrationalities $\tau=\frac{1}{2}(1+\sqrt{5})$ and $\tau'=\frac{1}{2}(1-\sqrt{5})$, the solutions of $x^2=x+1$. The first of the two is known from antiquity as the "golden ratio". Moreover in this specification, the description of the preferred embodiment has been limited to one-dimensional data and one-dimensional quasi-crystals. In the embodiment relating to watermarking, two dimensional quasi-crystals are used. It will be appreciated that two-dimensional data can be represented as one-dimensional, and vice versa, and that it is preferred to use a quasi-crystal having suitable dimensions for an application.

Higher dimensional quasi-crystals based on $\tau$ are well described and illustrated in the literature. Multidimensional encryption basically amounts to using one-dimensional quasi-crystals in several directions independently. (See the section on watermarking hereinbelow for more information on 2-dimensional quasi-crystals.)

To carry out the method according to the presently preferred embodiment, the following tasks must be accomplished:
1. Transmission over a secure channel of the symmetric encryption key which consists of a small number of real numbers.

Given the need to transmit only a few numbers comprising the encryption key, any conventional method can be used. The usual objections against public key system, that it is too slow, therefore do not apply in the present situation.
2. Generation of a fragment of a specific quasi-crystal, including the colors of its points, starting from any chosen seed point as given by the encryption key.

Since the quasi-crystal is infinite, the fragment can be theoretically of any length. This capacity to generate the points is used at both ends: during encryption and decryption. Generation of aperiodic point sets is known in the art. Herein is described a version of the algorithm adapted to the generation of one-dimensional quasi-crystals. Algorithms suitable for generation of quasi-crystals in any dimension are also known in the art.
3. Encryption/decryption of the data uses the specific quasi-crystal fragment, a coloring procedure and any of the many possible encryption functions.

The encryption function takes as its input several bits of the data and the colors of several specific quasi-crystal points. As output, it yields the corresponding bits of the encrypted data. Decrypting is the opposite process to the encryption which uses the same quasi-crystal points and their colors, and the inverse of the encryption transformation.

The method of generating quasi-crystal points described below takes advantage of the properties of the aperiodic point sets. Particularly important are the following properties:

(a) A one-dimension quasi-crystal is an aperiodic set of points. The method is geared for quasi-crystal which can be represented by real numbers of the form $m+n\beta$, where m and n are integers and $\beta$ is the solution of a suitable quadratic equation, such that $\beta>1>|\beta'|$ (see the paper given by P. Pleasants, in the Proc. of the 5th Conference on Quasicrystals, Avignon, 1995). The set is uniformly discrete and relatively dense everywhere on the real axis.

(b) Any quasi-crystal is aperiodic in the strongest sense: every subset of its points is aperiodic.

(c) There is an infinity of distinct 1-dimensional quasi-crystals. Quasi-crystal corresponding to algebraic irrationalities are completely determined by these irrationalities and a bounded set (the 'acceptance window' of the quasi-crystal). For example if $\beta$ and $\beta'$ are conjugated quadratic irrationalities determining the quasi-crystal $\Sigma(W_1, W_2)$ with acceptance window $(W_1, W_2)$, then $\Sigma(W_1, W_2)$ consists of all the points $a+b\beta$, with a and b integer, such that the point $a+b\beta'$ is contained in the acceptance window $(W_1, W_2)$, as illustrated in FIG. 1. Equivalently, one can write $$a+b\beta \in \Sigma(W_1,W_2) \text{ if } a+b\beta' \in (W_1,W_2) \text{ (acceptance condition)} \quad (1)$$

Here $\beta$ and $\beta'$ are the solutions of the underlying quadratic equation which must satisfy the inequalities $\beta>1>|\beta'|$.

The fundamental properties of the mapping of any point $a+b\beta$ (a and b integers) into $a+b\beta'$ and vice versa are not obvious. The acceptance window is always bounded and with non-empty interior, but in general it need not be connected, i.e. it could consist of several non-overlapping bounded intervals. Points of such a quasi-crystal can be obtained as a union of points of several quasi-crystal, each with a connected acceptance window. In special situation this may be useful. In the presently preferred embodiment, only quasi-crystals with connected acceptance windows are considered. Furthermore the requirement that the acceptance window is open (i.e. its end points do not belong to it) is a matter of convenience. Taking the endpoints as belonging to the window, one adds at most two points to the whole infinite quasi-crystal.

(d) Quasi-crystal with different windows are different. However, points of quasi-crystals $\Sigma(W_1, W_2)$ and $\Sigma(\beta W_1+m+n\beta, \beta W_2+m+n\beta)$ are related by $$\Sigma(\beta^s W_1+m+n\beta, \beta^s W_2+m+n\beta)=m+n\beta'+(\beta')^s\Sigma(W_1,W_2), \, m,n,s \text{ integers} \quad (3)$$

Thus a translation of an acceptance window by $m+n\beta$ and the rescaling of the acceptance window by an integer power of $\beta$ implies a corresponding affine transformation of the quasi-crystal.

(e) Due to (d), it suffices to use the origin as the seed point and only consider acceptance windows with finite length. For example, if $\beta$ is the positive solution of $x^2=x+1$, that is $\beta=\tau$, we may simply consider acceptance windows of length $c=W_2-W_1$ with $1 \leq c < \tau$. For $1<c<\tau$ there are always three possible distances between adjacent points ('tiles') of a quasi-crystal. Namely $1, \tau,$ and $\tau^2$. It will be appreciated that quasi-crystals with two different values of c within the interval $(1, \tau)$ are very different, that is they cannot be transformed into each other by affine mappings. In particular, the density of tiles of different length is different for each c. It will be appreciated that two points at distance $1, \tau,$ or $\tau^2$ in the quasi-crystal are mapped into the acceptance window with distance $1, \tau',$ or $\tau'^2$ respectively.

(f) Hierarchies among quasi-crystal points are introduced using colorings by a finite number of colors. A particular coloring scheme is independent of the acceptance window. Once a coloring has been chosen and fixed, the color of a point is instantly determined from its coordinates. There is a distinction between linear colorings, where the change of the color of an adjacent point depends only on its distance from its neighbor, and non-linear colorings, where the colors depend also on the position of the points in the quasi-crystal. In this way the variety of aperiodic point sets which are available to us is vastly enriched. Moreover, coloring of quasi-crystal points can involve any standard transformation used in cryptography.

In the case of a one-dimensional quasi-crystal, its points can be viewed as numbers on the real axis. How the data is prepared starting from a simple version of the encryption key containing five (5) positive real numbers (or more), i.e. the parameters needed for the generation of the quasi-crystal points and the coloring, will now be described. These parameters are the position and the length of the acceptance window, and the starting color of each type of tile. Moreover, the point may be generated successively in the direction of increasing or decreasing values from the seed point, or even in some prescribed order on both sides of the seed.

The irrational constants $\tau=\frac{1}{2}(1+\sqrt{5})$ and $\tau'=\frac{1}{2}(1-\sqrt{5})$ are used in the presently preferred embodiment. $\tau$ is equal to about +1.61180339887, and τ' is equal to about −0.61803398875. The degree of precision used in a numerical implementation may be higher.

In numerical implementations, the precision of the arithmetic operations on the computers which are to be used for encryption and decryption must be the same according to the presently preferred embodiment. It is worth noting that the value of the precision is not important, as long as it is consistent at both ends of the transmission.

The quasi-crystal points are to be computed as 2-component vectors with integer valued components. Thus computed, quasi-crystal points can be viewed as sequences A and B of integers. In particular, a point $a_i + b_i \tau$ will appear in them as $$A = (a_1, a_2, \ldots, a_i, \ldots), B = (b_1, b_2, \ldots, b_i, \ldots) \qquad (2)$$

In the following, three versions of algorithms for generation of aperiodic point sets are described. The first is the simplest and fastest generation of a quasi-crystal. In some extreme applications (e.g. very long messages) it may not be completely satisfactory as explained below. The second method overcomes the weaknesses of the first one but is slower. The third one is a mix of the two first methods which seems to be a good compromise between speed and precision.

Method I. Numerical generation of quasi-crystal points.

Starting from the origin, adjacent quasi-crystal points are computed one-by-one recursively. To do so, first the addition of the value 1 to the current point $a_{i-1} + b_{i-1}\tau$ is tested with respect to the acceptance condition, if it is verified, the next point is $a_{i-1} + b_{i-1}\tau + 1$. If it fails, the addition of the value τ is tested and if the acceptance condition is verified, the next point is $a_{i-1} + b_{i-1}\tau + \tau$. If the acceptance condition fails in both cases, the next point is $a_{i-1} + b_{i-1}\tau + 1 + \tau$. Thus a new quasi-crystal point $a_i + b_i \tau$ is computed. In the case of the 2-tile quasi-crystals, i.e. If the length of the acceptance window is 1, the only possible distances between adjacent points are τ and $\tau^2$, therefore only the addition of τ is tested. The generation of new points continues forever. It needs to be stopped by an explicit command.

Here is a description of the algorithm in which we are using the value −1/τ which is in fact equal to τ'.

Let the seed point be $a_0 + \tau b_0 = 0$. Therefore, $i := 0; \; p := a_0 - 1/\tau b_0 = 0;$ while the generation does
  begin $(a,b) := g(p);$ $i := i+1;$ $a_i := a_{i-1} + \alpha;$ $b_i := b_{i-1} + \beta;$ $p := a_i - b_i 1/\tau;$ end.

The function g(p) associates to the real variable p a pair a, b ∈ {0,1}.

begin if p+1 ∈ $(W_1, W_2)$ then α:=1, β:=0;
    else if p−1/τ∈$(W_1, W_2)$ then α:=0, β:=1;
      else α:=1, β:=1;
  end In the presently preferred numerical embodiment, it is crucial that the precision of evaluation of real numbers of the transmitter and receiver are identical. Their actual value has little importance. This can be explained as follows.

Figure 3:
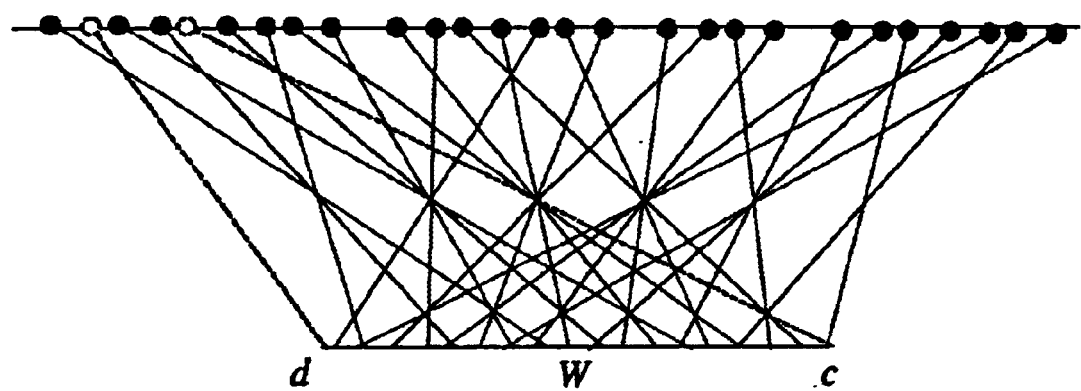
FIG. 3 illustrates a quasi-crystal subset of points on the real axis (top line) mapped onto its acceptance window in which points indicated by hollow circles which would be mapped outside of the acceptance window and are therefore not part of the subset are also shown.

Computing all points of a quasi-crystal without omissions would require an infinitely precise arithmetic. A finite precision leads to situations where two numbers are declared equal, even if a higher precision would distinguish them. Thus is occasionally happens that a point is omitted which satisfies the acceptance condition (for example, its image is in the acceptance window but so close to the boundary that it is declared to be the boundary point). FIG. 3 illustrates possible rounding errors: the quasi-crystal points are marked as full dots, and the semi-closed acceptance window is drawn on the lower axis. The theoretical projections are drawn as connected lines and the computed projections are drawn as dash lines when they lead to errors. The finite precision causes neighboring points to be numerically mapped to the same to point. Therefore all points in a sufficiently small neighborhood of an end point of the acceptance window are mapped to the same value, thus leading to erroneous results: acceptance of a non quasi-crystal point or rejection of a valid quasi-crystal point.

In the presently preferred numerical embodiment, it is imperative that both ends of the transmission react in exactly the same way to such points. The completeness of the quasi-crystal is of no importance.

That the completeness is of no importance is not trivial. However, one can show that the quasi-crystal generation does not break down if a point x of the quasi-crystal is erroneously thrown out when x' is confused with the end point of the acceptance window. Indeed, the algorithm will simply find the second next point rather than the adjacent and continue generating the needed quasi-crystal points. What is of importance is that both the encryption and decryption algorithm miss the same points.

The quantities to be stored with large precision are the integer value coordinates $a_i$ and $b_i$ of the last point found, and the value of τ. All other variables may have only a few digits (i.e. limited precision). During a sufficiently long generation of quasi-crystal points, their integer components may exceed reserved memory space. The product bτ' will also begin to require a larger memory space, and it is important that this product maintain a level of precision used by the acceptance window (for example, four decimal places) otherwise it would become impossible to continue to calculate further quasi-crystal points. Excessively large integers can be avoided by translating the quasi-crystal acceptance window according to eq. (2). Namely, if $a_i + b_i \tau$ is the point with critical value of $a_i$ or $b_i$, the window $(W_1, W_2)$ is replaced by the window $$\left( W_1 - a_i + \frac{b_i}{\tau},\; W_2 - a_i + \frac{b_i}{\tau} \right).$$

The generation starts then from the new seed point which is again the origin.

Using 32-bit precision, one can generate at most $2^{32}$ quasi-crystal points before the translation of the window is necessary. If the hardware can generate $10^6$ points of quasi-crystal points per second, the translation of the window takes place about once in an hour. In a fixed precision machine, translation may change the points generated, and therefore, it is important for both ends to translate simultaneously.

For the generation of quasi-crystal points, one needs to know at any stage only the previous point which has been found. It may, however, be useful for the encryption task to store a few more than only the last point.

The process just described depends on the precision of computation. For certain values in the key, it may happen that the translated window will result in generating the same set of points as before. This is due to the finite precision of the computer. In any finite size window, there are only finitely many points which the computer can recognize as distinct. Only in the ideal case can the window contain infinitely distinct points.

While in the preferred embodiment it is required for both ends to use the same precision, it is of course possible for precision information to be sent with the encrypted data to arbitrate precision-related issues. For example, the transmitted data may include one or more bits associated with a block of encrypted data to indicate whether the transmitter calculated a value which was within a first tolerance value from the acceptance window. In the case that the bit or bits so indicate, extra data concerning whether the transmitter determined whether each value calculated for the block was within or without the window is given. The extra data may be random data for those calculations determined to be clearly within or without the window by a second, larger tolerance, for example twice the first tolerance. In such cases, the receiver ignores the arbitration data, unless it determines that the value is within the first tolerance from the acceptance window. In this example, it is presumed that the difference between the first and second tolerances is greater than the greatest discrepancy between the sender's and receiver's calculation precision. As can be appreciated, the transmission of extra data to arbitrate precision discrepancies between the sender and receiver may add significant overhead, and therefore, it is preferably to fix the precision of the processors at both ends to be exactly the same.

Method II. Symbolic generation of quasi-crystal points.

It is possible to generate points of a 1-dimensional quasi-crystal by certain substitution rules defined on an alphabet which consists of a few letters, each letter representing an approximate distance ('tile') between adjacent points of the quasi-crystal. The substitution rule works for any quasi-crystal with boundary points of its acceptance window of the form m+nβ (see theorem 5.10 and corollary 5.11 of the appendix hereinbelow). Indeed, in every quasi-crystal and for every point x of the quasi-crystal, we can build substitution rules that will generate the quasi-crystal segment from x on to the right. For that, one considers the letters as the appropriate distances (tiles) between adjacent quasi-crystal points. These rules generate an exact quasi-crystal independent of the precision of the arithmetic operations.

The quasi-crystal with two tiles, say A and B, is generated starting with the tile A and proceeds by repeated substitutions.

$$A \to AAB \text{ and } B \to AB$$

An example of the first three steps of the process:

$$A \to AAB \to AABAABAB \to AABAABABAABAABABAABAB \to \ldots$$

it can be shown that this sequence becomes the sequence of points of the quasi-crystal $\Sigma(0,1)$ starting from the point 0, if one interprets A and B as tiles of length $\tau^2$ and $\tau$ respectively. The substitution rules are symbolic operations independent of the precision of computation. Similar rules can be formulated for reference quasi-crystals with three tiles and for generation starting from any quasi-crystal point. In general, the substitution rules depend on the type of the quasi-crystal and on position of the seed point from which the generation starts. In the appendix included hereinbelow, a description of how to obtain substitution rules for a given quasi-crystal is provided.

The main advantage of Method II is its absolute precision. There is however a price to pay for it: the method is generally slower than Method I, and it is more memory consuming. Although it may appear that the memory requirement should grow linearly with the length of the generated sequence, it can be shown that the memory requirement grows only logarithmically with the length of the generated sequence of the quasi-crystal points.

A more sophisticated example of a 3-letter substitution rule is:

$$S \to SMLM, \ L \to SMLMSMLMSMM, \text{ and } M \to SMLMSMM$$

Assigning the following lengths to the letters S,L,M, $$S=1, M=96, L=\tau^2 \text{value } \tau$$

the endpoints of the tiles S,L,M form the quasi-crystal $\Sigma(0, 1+1/\tau^2)$ after a repeated application of the substitution rule.

Finally one can also introduce the method of shifting the window as in method I. At a moment where the memory is almost all filled, one can use the current point, for example in the form $\tau^n$ for some very large n, and build new substitution rules generating the segment of quasi-crystal from $\tau^n$ on to the right. Keeping this set of new rules, one can free up memory and continue the quasi-crystal generation. Such substitution rules could be prepared in advance for given values $\tau^n$, for suitable n. To illustrate this shifting technique, one considers the quasi-crystal with acceptance window $$\Omega = \left[ -\frac{1}{\tau^2} + \frac{1}{\tau^{30}}, 1 + \frac{1}{\tau^{30}} \right)$$

and set n=30. This value of n is chosen to simplify the example itself rather than improve an embodiment. Indeed, n is much to small: it leads to a shift after only about 50 iterations.

The quasi-crystal generation starts from zero. The substitution rule generating the quasi-crystal $$\Omega = \left[ -\frac{1}{\tau^2} + \frac{1}{\tau^{30}}, 1 + \frac{1}{\tau^{30}} \right)$$

is defined on an alphabet A of 32 letters $\{S_1, S_2, L_1, L_2, \ldots, L_{14}, M_1, M_2, \ldots, M_{16}\}$. The generation begins with the letter $S_1$ and the substitution rules are the following:

| | | |
|---|---|---|
| $S_1 \mapsto S_1 M_{16}$ | $S_2 \mapsto S_2 M_{15}$ | $L_1 \mapsto S_1 M_{16} M_2 S_2 M_{15}$ |
| $L_2 \mapsto L_1 M_2 S_2 M_{15}$ | $L_3 \mapsto L_1 M_2 S_2 M_{15}$ | $L_4 \mapsto L_3 M_2 S_2 M_{15}$ |
| $L_5 \mapsto L_4 M_2 S_2 M_{15}$ | $L_6 \mapsto L_5 M_2 S_2 M_{15}$ | $L_7 \mapsto L_6 M_2 S_2 M_{15}$ |
| $L_8 \mapsto L_7 M_2 S_2 M_{15}$ | $L_{10} \mapsto L_9 M_2 S_2 M_{15}$ | $L_{11} \mapsto L_{10} M_2 S_2 M_{15}$ |
| $L_{12} \mapsto L_{11} M_2 S_2 M_{15}$ | $L_{13} \mapsto L_{12} M_2 S_2 M_{15}$ | $L_{14} \mapsto L_{13} M_2 S_2 M_{15}$ |
| $M_1 \mapsto L_{13} M_2$ | $M_2 \mapsto L_{14} M_2$ | $M_3 \mapsto M_1 S_2 M_2$ |
| $M_4 \mapsto M_1 S_2 M_3$ | $M_5 \mapsto M_1 S_2 M_4$ | $M_6 \mapsto M_1 S_2 M_5$ |
| $M_7 \mapsto M_1 S_2 M_6$ | $M_8 \mapsto M_1 S_2 M_7$ | $M_9 \mapsto M_1 S_2 M_8$ |
| $M_{10} \mapsto M_1 S_2 M_9$ | $M_{12} \mapsto M_1 S_2 M_{11}$ | $M_{13} \mapsto M_1 S_2 M_{12}$ |
| $M_{14} \mapsto M_1 S_2 M_{13}$ | $M_{15} \mapsto M_1 S_2 M_{14}$ | $M_{16} \mapsto M_1 S_2 M_{15}$ |

For example, the second iteration leads to:

$$S_1 M_{15} M_2 S_2 M_{15}$$

and the fourth iteration leads to:

$$S_1 M_{15} M_2 S_2 M_{15} L_{14} M_2 S_2 M_{15} M_1 S_2 M_{14} L_{13} M_2 S_2 M_{15} L_{14} M_2 S_2 M_{15}$$
$$L_{14} S_2 M_{14} L_{13} M_2 S_2 M_{15} L_{14} M_2 S_2 M_{15} M_1 M_1 \ S_2$$

$$M_{13}$$

Only the $i^{th}$ iteration's s result needs to be saved in memory in order to compute the $(i+1)^{th}$ iteration. To obtain the quasi-crystal sequence, one simply replaces all the $S_i$ by S, $L_i$ by L and $M_i$ by M. If a long data stream needs to be encrypted, a memory shortage can occur. The shifting process is used to prevent such a problem.

The shifting process uses the fact that we can find suitable n such that the quasi-crystal $\Sigma(\Omega)$ can be written in the form $\Sigma(\Omega)=\tau^n+\Sigma(\Omega')$, with $x=\tau^n \in \Sigma(\Omega)$. In our example $$\sum(\Omega) = \tau^{30} + \sum \left[-\frac{1}{r^2}, 1\right)$$

and $x=\tau^{30} \in \Theta(\Omega)$. Therefore when the iteration process reaches the value $x=\tau^{30}$, a new set of substitution rules can be used to generate the quasi-crystal $$\sum \left[-\frac{1}{r^2}, 1\right)$$

starting from zero. The new substitution rule has a 4-letter alphabet $B=\{S, L, M_1, M_2\}$ beginning with the letter L.

$L|\rightarrow LM_1SM_2$ $S|\rightarrow SM_2$ $M_1|\rightarrow LM_1$ $M_2|\rightarrow M_1SM_2$.

The quasi-crystal sequence is the concatenation of the first sequence of letters generated from alphabet A with the second sequence of letters generated from alphabet B.

The shifting works as follows: when the first iteration process using the 32 letter alphabet reaches the value $\tau^{30}$, the memory is emptied and the quasi-crystal generation starts over from zero with the new quasi-crystal $\Sigma(\Omega')$ using the new substitution rule if $\tau^{30}$ is obtained after 50 iterations, the $51^{st}$ iteration would lead to $LM_1SM_2$ the $52^{nd}$ to $LM_1SM_2LM_1SM_2M_1SM_2$ and so on.

Method III. Combination of several quasi-crystals.

The aperiodic sequence of points in this variant of the method is composed of fractions of two or more quasi-crystals (called basic quasi-crystals), each of which is generated essentially by the method described in I or II. The composition of the fractions may be predetermined or it can be governed by another quasi-crystal, called the 'reference quasi-crystal'.

The method is illustrated here in the following set up. Two quasi-crystals specified by their windows and a reference quasi-crystal which has two distinct tiles are used. The aperiodic sequence starts by a segment of one of the two quasi-crystals. The segment is generated from the seed point as in Method I. The generation proceeds up to the moment where, in the method described in I, the translation operation of the window would have taken place. In order to continue the generation, one looks at the length of the current tile of the reference quasi-crystal to decide whether to translate the window of the same basic quasi-crystal, or whether to switch to another basic quasi-crystal for the next segment of the aperiodic sequence.

The aperiodic sequence constructed in this way consists of aperiodic combinations of different segments of the two quasi-crystals. It is not periodic regardless of its length. A practical limitation of the method is only the memory requirements during generation of the reference quasi-crystal. In the typical situation described at the end of I, one needs to use one point of the reference quasi-crystal every hour.

Two examples of quasi-crystal generation

In this section, two examples of specific quasi-crystals are described by determining some of their points near the seed point. The quasi-crystal of the first example is as simple as possible, namely a 2-tile quasi-crystal. The second quasi-crystal is a 3-tile quasi-crystal.

EXAMPLE 1

TABLE 1

| i | $a_i$ | $b_i$ | $a_i + b_i\tau$ | $a_i + b_i\tau^2$ | $c_1$ | $c_1$ (binary) | $c_2$ | $c_2$ (binary) |
|---|---|---|---|---|---|---|---|---|
| 0 | 0 | 0 | 0.0000 | 0.0000 | 0 | 0000 | 0 | 0000 |
| 1 | 1 | 1 | 2.6180 | 0.3820 | 7 | 0111 | 11 | 1011 |
| 2 | 2 | 2 | 5.2361 | 0.7639 | 14 | 1110 | 6 | 0110 |
| 3 | 2 | 3 | 6.8541 | 0.1459 | 14 | 1110 | 1 | 0001 |
| 4 | 3 | 4 | 9.4721 | 0.5279 | 5 | 0101 | 12 | 1100 |
| 5 | 4 | 5 | 12.0902 | 0.9098 | 12 | 1100 | 7 | 0111 |
| 6 | 4 | 6 | 13.7082 | 0.2918 | 12 | 1100 | 2 | 0010 |
| 7 | 5 | 7 | 16.3262 | 0.6738 | 3 | 0011 | 13 | 1101 |
| 8 | 5 | 8 | 17.9443 | 0.0557 | 3 | 0011 | 8 | 1000 |
| 9 | 6 | 9 | 20.5623 | 0.4377 | 10 | 1010 | 3 | 0011 |
| 10 | 7 | 10 | 23.1803 | *0.8197 | 1 | 0001 | 14 | 1110 |
| 11 | 7 | 11 | 24.7984 | 0.2016 | 1 | 0001 | 9 | 1001 |
| 12 | 8 | 12 | 27.4164 | 0.5836 | 8 | 1000 | 4 | 0100 |
| 13 | 9 | 13 | 30.0344 | 0.9656 | 15 | 1111 | 15 | 1111 |
| 14 | 9 | 14 | 31.6525 | 0.3475 | 15 | 1111 | 10 | 1010 |
| 15 | 10 | 15 | 34.2705 | 0.7295 | 6 | 0110 | 5 | 0101 |
| 16 | 10 | 16 | 35.8885 | 0.1115 | 6 | 0110 | 0 | 0000 |
| 17 | 11 | 17 | 38.5066 | 0.4934 | 13 | 1101 | 11 | 1011 |
| 18 | 12 | 18 | 41.1246 | *0.8754 | 4 | 0100 | 6 | 0110 |
| 19 | 12 | 19 | 42.7426 | 0.2574 | 4 | 0100 | 1 | 0001 |

The table shows an example of 20 points of the 2-tile quasi-crystal with acceptance window $(W_2, W_1)=(0,1)$. Each line refers to one quasi-crystal point, the first one being the seed point. In column 1 the lines are numbered. Columns 2 and 3 contain respectively the components $a_i$ and $b_i$ of the quasi-crystal point $Y_i=a_i+b_i\tau$, $0 \leq i \leq 19$, Column 4 contains $Y_i$ as a rounded real number. In column 5 we show the image $Y_i'=A_i+b_i\tau'$ of $Y_i$ in the acceptance window; asterisks identify the values of $Y_i'$ in the window $(V_2,V_1)=(0.8,0.9)$ of the subquasi-crystal which determines the position of random bits. Colomns 6 and 8 contain the colors $c_1$ and $c_2$ of $Y_i$ as integers modulo 16 respectively. Column 7 and 9 contains the same colors $c_1$ and $c_2$ written in binary form.

The first example has the 'simplest' possible values in its key: all parameters equal 0 except for c, the length of the acceptance window, which has to be positive and is set to 1. Since c=1, it is a 2-tile quasi-crystal. The first 20 points $a_i+b_i\tau$ ($0 \leq i \leq 19$) are shown in Table 1. Each of the 20 lines refers to one quasi-crystal point, the first one being the seed point. In the first column, the points are enumerated. In the next two columns, the integer components $a_i$, $b_i$ of each point are shown; and in column four the point is given as a rounded real number. Column five contains the rounded real number $a_i+b_i\tau'$. It gives the position of the image of the point in the acceptance window. Reading the first few points from that table, the values are $0, 1+\tau, 2+2\tau, 2+3\tau, 3+4\tau, 4+5\tau, 4+6\tau, 5+7\tau$ Note that the distance between any pair of adjacent points is either $\tau+1=\tau^2$ or $\tau$ as one should expect in a 2-tile quasi-crystal.

EXAMPLE 2

There are 20 points in the second example. They are shown in Table 2. They were generated for a three tile quasi-crystal with an acceptance window length of 1,4984 with $W_1$=1.1988. The four decimal places of precision for the acceptance window values is chosen arbitrarily for both the transmission and receiving ends, and the amount of precision should be different (greater of even less). In this example, the seed point is not the origin but rather $a_0+b_0\tau$= 4483+7251$\tau$, The image of the seed point in the acceptance region is $a_0+b_0\tau'$=4483+7251$\tau'\approx$1.6355.

The first few points are the following: 4483+7252$\tau$, 4484+7251$\tau$, 4484+7252$\tau$, 4484+7253$\tau$, 4485+7253$\tau$, 4485+7254$\tau$, 4486+7255$\tau$, 4486+7256$\tau$, . . .

Here the distances between adjacent points are either 1, $\tau$, or $\tau+1$ as one should expect in a 3-tile quasi-crystal.

TABLE 2

| i | $a_i$ | $b_i$ | $a_i + b_i\tau$ | $a_i + b_i\tau'$ | $c_1$ | $c_1$ (binary) | $c_2$ | $c_2$ (binary) |
|---|------|------|----------------|-----------------|-------|----------------|-------|----------------|
| 0 | 4483 | 7251 | 16215.3645 | 1.6355 | 1 | 0001 | 12 | 1100 |
| 1 | 4484 | 7257 | 16216.3645 | 2.6355 | 3 | 1011 | 11 | 1011 |
| 2 | 4484 | 7252 | 16217.9825 | 2.0175 | 12 | 0000 | 0 | 0000 |
| 3 | 4484 | 7253 | 16219.6005 | 1.3995 | 5 | 0101 | 5 | 0101 |
| 4 | 4485 | 7253 | 16220.6005 | 2.3995 | 7 | 0111 | 4 | 0100 |
| 5 | 4485 | 7254 | 16222.2186 | 1.7814 | 0 | 0000 | 9 | 1001 |
| 6 | 4486 | 7255 | 16224.8366 | *2.1634 | 11 | 1011 | 13 | 1101 |
| 7 | 4486 | 7256 | 16226.4546 | 1.5454 | 4 | 0100 | 2 | 0010 |
| 8 | 4487 | 7256 | 16227.4546 | 2.5454 | 6 | 0110 | 1 | 0001 |
| 9 | 4487 | 7257 | 16229.0727 | 1.9273 | 15 | 1111 | 6 | 0110 |
| 10 | 4487 | 7258 | 16230.6907 | 1.3093 | 8 | 1000 | 11 | 1011 |
| 11 | 4488 | 7258 | 16231.6907 | 2.3093 | 10 | 1010 | 10 | 1010 |
| 12 | 4488 | 7259 | 16233.3087 | 1.6913 | 3 | 0011 | 15 | 1111 |
| 13 | 4489 | 7259 | 16234.3087 | 2.6913 | 5 | 0101 | 14 | 1110 |
| 14 | 4489 | 7260 | 16235.9268 | 2.0732 | 14 | 1110 | 3 | 0011 |
| 15 | 4489 | 7261 | 16237.5448 | 1.4552 | 7 | 0111 | 8 | 1000 |
| 16 | 4490 | 7261 | 16238.5448 | 2.4552 | 9 | 1001 | 7 | 0111 |
| 17 | 4490 | 7262 | 16240.1628 | 1.8372 | 2 | 0010 | 12 | 1100 |
| 18 | 4490 | 7263 | 16241.7809 | 1.2191 | 11 | 1011 | 1 | 0001 |
| 19 | 4491 | 7263 | 16242.7809 | *2.2191 | 13 | 1101 | 0 | 0000 |

The table shows an example of 20 points of the 3-tile quasi-crystal with acceptance window $(W_2,W_1)$=(1.1988, 2.6972). Each line refers to one quasi-crystal point, the first one being the seed point. In column 1 the lines are numbered. Columns 2 and 3 contain respectively the components $a_i$ and $b_i$ of the quasi-crystal point $Y_i=a_i+b_i\tau$, $0 \leq i \leq 19$. Column 4 contains $Y_i$ as a rounded real number. In column 5, the image $Y_i'=a_i+b_i\tau'$ of $Y_i$ in the acceptance window is shown; asterisks identify the values of $Y_i'$ in the window $(V_2,V_1)$=(2.15,2.25) of the subquasi-crystal which determines the position of random bits. Column 6 and 8 contain the colors $c_1$ and $c_2$ of $Y_i$ as integers modulo 16 respectively. Column 7 and 9 contain the same colors $c_1$ and $c_2$ written in binary form.

Coloring of quasi-crystal points, generation of the keystream and 3 examples.

Once quasi-crystals and aperiodic sequences have been generated (using for example method I, II, of III), the keystream is constructed by coloring selected points of the aperiodic sequence, i.e. assigning binary strings to points of the sequence, strings which are then concatenated to form the keystream. The coloring prescribes how the assignment is performed.

Let K be a finite set of binary strings and S some arbitrary set (for example a quasi-crystal $\Sigma$). Each element of K is called a color, and any mapping M: S→K from S to K is called coloring.

In the proposed method, a set $\Sigma_A$ composed of points from one or several quasi-crystals is generated. The points of this set are then colored. More precisely, a set K of colors is defined (either from the key or fixed by the algorithm) as well as a mapping M: $\Sigma_A$→K from $\Sigma_A$ to K (again given from the key of fixed by the algorithm). The keystream is then obtained as the concatenated value of all binary strings in M($\Sigma_A$). There exists infinitely many possible M and K, and thus infinitely many colorings. However some colorings lead to cryptographically unsecure ciphers, therefore they must be selected carefully with respect to the specific security requirements of the stream ciphers' applications.

There exist mappings such that monochromatic subsets of $\Sigma_A$ form subquasi-crystals. For example, if $\Sigma_A$ is a fragment of a single quasi-crystal, the mappings must satisfy the conditions described in the paper by R. V. Moody, Jiri Patera, Colorings of quasi-crystals, Can. J. Phys. 72 (1994) 442–452.

Coloring sets can be obtained in many ways. One simple way consists in using PRNG's with good statistical properties (even though K may have a large number of elements, the periodicity of the PRNG insures that it will be finite). In this case, the mapping M is define such that it uses the a periodicity of $\Sigma$ to break any pattern in the PRNG, patterns such as the period. As for K, there are infinitely many possible mappings M, but the mapping, along with the set K, must be chosen such that the cipher will be cryptographically secure. We now give examples of colorings. The first example uses a mapping to the set K={0,1, . . . , $q_1$}. The mapping is fixed by two integer parameters $p_1$, $q_1$, and two basis vectors $e_1$, $e_2$ of the lattice of real numbers $Z^2$. The parameters $p_1$, $q_1$, and the vectors $e_i$ can be part of the key or can be fixed in software or hardware depending on the purpose.

The points of the quasi-crystals are considered as pairs (m, n) of the lattice $Z^2$ rather than of the form m+n$\tau$. Using such notation, the point is translated or transformed relative to the new basis (m,n)→$x_1e_1+x_2e_2$ by finding the appropriate integers $x_1$ and $x_2$.

The color $c_1$ of the point m+n$\tau$ is given by the prescription (linear coloring)

$$c_1 = p_1(x_1+x_2) \bmod q_1.$$

This mapping is however not very secure since for two adjacent quasi-crystal points e>f, $|x_{e,1}+x_{e,2}-(x_{f,1}+x_{f,2})| \leq 2$.

An example of a simple non-linear coloring scheme is the following:

$$c_1 = p_1(x_1^2+x_2) \bmod q_1.$$

As a last example of coloring, consider the set K=$K_1 \cup K_2 \cup K_3$, where the $K_i$ values are generated from three (possibly identical) PRNG's having good statistical properties (for randomness). The mapping is defined recursively as follows: let e>f be two adjacent quasi-crystal points:

$$M(p) = \begin{cases} \text{an element of } K_1 & \text{if } e-f = 1 \\ \text{an element of } K_2 & \text{if } e-f = \tau \\ \text{an element of } K_3 & \text{if } e-f = \tau^2 \end{cases}.$$

Selecting the elements of the $K_i$ sets properly leads to a coloring much more secure than the two previous ones. This coloring, which is used in the presently preferred embodiment is now discussed in more detail. The discussion is made for two tile quasi-crystals but is easily generalized to three tile quasi-crystals. Let the following PRNG's:

$$x_{i,n+1} = \left\lfloor \frac{(a_i x_{i,n} + c_i) \bmod 2^{32}}{2^{16}} \right\rfloor, \quad (3_i)$$

with i=1,2, $a_i$ mod 4=1, and $c_i$ mod2 =1 ($\lfloor X \rfloor$=largest integers smaller than x). Unless $a_i$ is chosen badly, $(3_i)$ is satisfactorily random (with respect to statistical properties (but is not cryptographically secure, and this for all i=1,2 (see D. E. Knuth, Deciphering a Linear Congruencial Encryption, IEEE transaction on information theory, vol. It-31, no. 1, 1985). Indeed, for any fixed 'i' one can deduce the parameters $a_i$ and $c_i$ from a finite sufficiently long sub-sequence. The sets $k_i$ are defined as follows:

$$K_i = \{x_{ij}, j=1, \ldots, 2^{16}\},$$

where $x_{ij}$ are given by $(3_i)$ for j≧2, and $x_{i,1}$ are some integers between 0 and $2^{16}-1$ (which could be, for example, given by the encryption key or fixed in software or hardware depending on the purpose). The mapping M is then defined as follows: if e and f are two adjacent quasi-crystal points, $$M(p) = \begin{cases} x_{1,j} & \text{if } e-f = \tau \text{ and it is the } (j \bmod 2^{16}+1) \text{ occurance of a } \tau-\text{tile} \\ x_{2,j} & f\ e-f = \tau^2 \text{ and it is the } (j \bmod 2^{16}+1) \text{ occurance of a } \tau^2-\text{tile} \end{cases}.$$

The strength of this coloring relies on the fact that the values of either PRNG appear aperiodically, thus adding much complexity to the keystream. This example could even lead to a cryptographically secure stream cipher.

EXAMPLES 4 AND 5

The linear and non-linear coloring method described above are illustrated in Tables 1 and 2. For each method, two colorings $c_1$ and $c_2$ are computed from different parameter values. The coloring method uses in the presently preferred embodiment deals with 16-bit words and can not be illustrated simply. In the first example shown in Table 1, we illustrate two linear colorings where the chosen parameters are the standard basis of the lattice $Z^2$, $e_1$=(1, 0), $e_2$=(0, 1) p=7 in the first coloring and p=11 in the second, and q=16 in both.

It will be appreciated that the linear colorings in Table 1 yields somewhat predictable values. For example, the values of $c_1$ (the first coloring) either hold or are incremented by 7, and the values of $c_2$ (the second coloring) are decrement by 5 in each iteration. For $c_1$, the values cannot hold for more than one iteration, and they cannot increment for more than two iterations without holding. Therefore, after a hold for $c_1$, the event of a single increment of a double increment before the next hold is a purely random one. In the embodiment of Table 1, the 20 quasi-crystal points have 7 such events, and the sequence of bits representing these events would be 1101100, where a '1' represents a double increment following a hold, and a '0' represents a single increment following a hold. Of course, the increments of the value $c_1$ are related to the quasi-crystal points, i.e. a hold is really a τ tile and an increment is really a 1+τ tile.

It will also be appreciated that the quasi-crystal(s) may be used to directly generate values used in encryption, or the quasi-crystal values may be used to alter encryption pad value generator parameters from time to time. In the second example shown in Table 2, we illustrate two non-linear colorings where the chosen parameters are the basis of the lattice $Z^2$, $e_1$=(1, -3) and $e_2$=(-1, 2). The remaining parameters are left unchanged: p=7 in the first coloring and p=11 in the second, and q=16 in both.

It will also be appreciated that more complex coloring, such as non-linear coloring, allows for quasi-crystal points to be translated and "expanded" into a plurality of bits for encryption purposes. In some encryption circumstances, it may be acceptable for the encryption key to have exclusion rules for certain transitions from one value to the next, since each value may be used to encrypt a very small portion of a message, such as computer words. The effect of the aperiodicity of the quasi-crystal on the encryption of any significant portion of the message susceptible of an attack may thereon be sufficiently strong.

Insertion of random bis

Insertion of random bits into an encrypted text disrupts the splitting of the text into regular equally sized blocks. In the preferred embodiment, it is governed by a chosen subquasi-crystal. The parameters $V_1$, $V_2$ specifying the subquasi-crystal $\Sigma(V_1, V_2)$ satisfy $$W_1 < V_1 < V_2 < W_2$$

The quasi-crystal points and $\Sigma(W_1, W_2)$ are thus of two types: those which belong to the subquasi-crystal $\Sigma(V_1, V_2)$ and those which do not belong to it. Relative density of the points of $\Sigma(V_1, V_2)$ to all points of $\Sigma(W_1, W_2)$ is equal to the ratio of lengths of the corresponding windows $|V_2-V_1|/|W_2-W_1|$.

In practice the parameters $V_1$ and $V_2$ can either be given independently as part of the key or be determined automatically as functions of $W_1$ and $W_2$. Practical considerations should guide the number of random bits to be inserted and their types. The random bits use additional bandwidth during transmission and are simply ignored when received. Another possibility is to send simultaneously 2 or 3 different interlaced messages, using quasi-crystals $\Sigma(W_1, V_1)$, $\Sigma(V_1, V_2)$, $\Sigma(V_2, W_2)$.

EXAMPLES 6 AND 7

In the first quasi-crystal example given hereinabove and shown in Table 1, the acceptance window has parameter $W_1$=0, $W_2$=1. The window of the subquasi-crystal may be chosen to be with parameters $V_1$=0.8, $V_2$=0.9. In the column denoted a+bτ' in Table 1, the points labeled by asterisks are in the window of the subquasi-crystal.

In the second quasi-crystal example shown in Table 2, the acceptance window has parameters $W_1$=1988, $W_2$=2.6972. The window of the subquasi-crystal is chosen to be with parameters $V_1$=2.15, $V_2$=2.25. In the column denoted a+bτ', the points labeled by asterisks are in the window of the subquasi-crystal.

Encryption transformation

In the presently preferred embodiment, each point of the quasi-crystal is used to encrypt one 16-bit block of the original message (in fact, any value n could be used; to do so, simply replace 16 by n in the embodiment). The encryption is done as follows. For each generated point $p_i$ of the quasi-crystal, its corresponding color $M(p_i)=c_i$, is written in binary form as a 16-tuples of bits $Y_i$. Instead of an aperiodic sequence of quasi-crystal points, an aperiodic sequence of 16-tuples of bits (colors) is obtained. In the presently preferred embodiment, the 16-tuples of bits from the colors are used directly during the encryption as the keystream, that is without bit insertions.

Encryption is a rule how to compute from the n-tuple of the plaintext and an n-tuple of the keystream, an encrypted n-tuple. A possible encryption function is the standard exclusive-OR (xor) operation running simultaneously through the pairs consisting of one bit of the plain text and one bit of the keystream. The XOR operation is defined by the following formula:

(0XOR 0)=(1XOR1)=0

(1XOR 0)=(0XOR1)=1

The security of the encryption is in the keystream and in the insertion of random bits. Therefore such as a simple (and fast) encryption function is adequate.

In the simplest case the keystream is the sequence of colors of quasi-crystal points wherein in binary form. This is the case in the presently preferred embodiment.

EXAMPLE 8

The keystream is composed from either the last or the third to last column of Table 1. The 4-tuple on each line is concatenated with the 4-tuple of the next line. The 4-tuples of lines 11 and 19, referring to the suquasi-crystal points, are preceded by random bits. XOR'ing a plaintext message with the keystream built above results in a ciphertest ready for transmission. The encrypted message is shown on the third line of Table 3.

consists of single characters repeated many times. The first (simpler) keystream of Table 3 is also usable for encryption provided the random bits are inserted into the encrypted text.

Finally, the insertion of random bits into the encrypted message is done assuming that it is known which quasi-crystal points belong to the chosen subquasi-crystals $\Sigma(V_1, V_2)$. Then the n-tuples of bits corresponding to these quasi-crystals points in the encrypted message is known. Before transmitting any such n-tuple, one inserts in front of it j random bits. The value of j can either be the part of the key or be fixed by the software or in hardware. Very small values of j are perfectly adequate.

In Tables 1 and 2, the images of quasi-crystal points which fall into the window of the subquasi-crystal, are marked by an asterik. In Tables 3 and 4, the position of the inserted random bits is marked by r.

Decryption

In the presently preferred embodiment of a stream cipher, decryption is a task as demanding as encryption. The encryption function associates with several bits of the plain data several bits of the encrypted data (according to the details of the chosen setup). The function must be inevitable, which means that the this association can be read in the opposite direction. In the encryption examples XOR has been used together with the insertion of random bits as the encryption function/procedure.

The receiver, knowing the key, generates the same quasi-crystal points, with the same precision as the transmitter, and with the same coloring, starting from the same seed point. It identifies the position of random bits during the generation of the quasi-crystal points and ignores them. It uses the inverse of the encrypting function to decode the bits of the encrypted data. In the examples given herein, the inverse function is again the same XOR operation.

TABLE 3

01010101010101010101010101010101010101 0101010101010101010101010101 01010101
0000011111101110010111001100001100111010r000100011000111111110110011011010r01000100
010100101011101110000100110010110011011111r01000100110110101010001100111000r00010001

The table shows encryption from Example 8 using the 20 points of Table 1 with coloring $c_1$. The first line is a periodic plaintext. The second line is the keystream. The third line is the XOR of vertically aligned pairs from the lines one and two. Random bits are denoted r, they have no corresponding bits in the plaintext.

EXAMPLE 9

The simplicity of the XOR function as the encryption function is possible because of the quasi-crystalline properties of the keystreams. Such an encryption is also extremely fast.

In Table 3 and 4, examples where words repeated in the plain message are encrypted differently are given.

The encryption explained and illustrated above can be iterated several more times, using either the same or a new

TABLE 4

0101010101010101010101 0101010101010101010101010101010101010101010101 0101
110010110000010101001001r11010010000101101011101011111100011100001111000001r0000
100111001010000000111100r10000111010000111110111110101011011011010010101100r0101

The table shows encryption from Example 9 using 20 points of Table 2 with coloring $c_2$. The first line is a periodic plaintext. The second line is the keystream. The third line is the XOR of vertically aligned pairs from the lines one and two. Random bits are denoted by r, they have no corresponding bits in the plaintext.

In Table 4, the same plain text as in Example 7 is encrypted by the keystream built from the third to last column of Table 2. This keystream does not allow for the coloring parameters to be determined even if the plaintext seed and/or quasi-crystal. Each subsequent level of encryption is independent of the previous one. In that the encrypted data at every level looks very different.

The method according to the present invention is applicable to any sequence of digital data (bits) regardless of the message carried (text, voice, image, etc.). The quasi-crystals are known and can be efficiently generated in two-, three-, or more dimensions. In such an encryption, higher dimensional data do not need to be decomposed into a linear sequence of bits. At present, a practical limitation is the transmission technology and computing power. The present encryption method is directly extendable to higher dimensional data (see the section on watermarkings for discussion on 2-dimensional quasi-crystals). Combined with parallel processing, encryption of higher dimensional data is very effective.

The aperiodic encryption method can be directly used for standard cryptographic applications: broadcast encryption and wireless telephony, video signal encryption, digital watermarking, electronic cash operations, etc.

The minimal information which has to be conveyed, e.g. in the key, must be equivalent to the following:
The irrationality on which the scheme is based;
Boundaries of the acceptance window and the seed point;
Coloring parameters (the actual number of parameters depends on the type of the coloring).

Keystreams with greater complexity can be obtained by introducing further modifications to the generation of the basic keystream. The minimal key space is then enlarged by the range of the additional parameters. The modifications can come either from proven existing encryption methods, or they can be related to the properties of quasi-crystals.

The modifications which the additional parameters would describe are, for example, the following ones:
Insertion of random bits into the sequence;
Use of two or more quasi-crystals for building up the keystream and the rules governing how to switch between them during the generation of the sequence,
Coefficients of the encryption function which combines the plain text and the keystream;
The number of times the encryption is repeated.

Description of Block Cipher Embodiment

Some current encryption practices known as block ciphers are based on the use of a specified block size and a short encryption key which encrypts blocks of plaintext into blocks of ciphertext according to an encryption scheme. In most block ciphers, the encryption scheme is an n-step iteration process of a basic encryption scheme. With the knowledge of the decryption key and the block size, decryption can start from anyblock of the ciphertext.

The block cipher embodiment can be provided using the fact that a given quasi-crystal can be generated from any of its points. For this, one needs to determine the size of the blocks and convey to the decryption end the coordinates of the quasi-crystal point which starts each block. This requirement can be achieved in a number of ways using software, the key or a simple convention (say a fixed number of points in each block) and within any of the three methods of generation of quasi-crystals mentioned above.

For example, the encryption could be done as a simple modification of the stream cipher encryption described above. Assume the block size is set to $b_1$:

1. Divide the plaintext P in blocks of block size $b_1$, that is $P=P_1P_2P_3\ldots$, where $P_i$ are blocks of block size $b_1$;
2. Generate the keystream $K=K_1K_2K_3\ldots$, where $K_i$ are blocks of block size $b_1$;
3. Specify a second block size $b_2$ sufficiently large to contain the coordinates of a quasi-crystal point with sufficient precision.
4. After each block $P_1$ of plaintext in P, insert a block $B_{i+1}$ of block size $b_2$ containing the coordinates of the quasi-crystal point corresponding (through coloring) to the first bit(s) of the block $K_{i+1}$ in the keystream K, that is, $P=P_1B_2P_2B_3P_3B_4\ldots$;
5. The ciphertext C is then obtained by XOR'ing the corresponding $P_i$ and $K_i$ blocks, leaving the coordinate values non-encrypted. More precisely, $C=C_1B_2C_2B_3C_3\ldots$, where $C_i=P_i$ XOR $K_i$.

In this example, the decryption scheme makes use of the block size $b_1$ and $b_2$. To decrypt the ciphertext starting from block $C_1$, one processes as for the stream cipher decryption, ignoring every block $B_i$. To decrypt the ciphertext starting at block $C_i$, one uses the (non-encrypted) value $B_i$ as the quasi-crystal seed point to generate the keystream and processes as for the stream cipher decryption, ignoring every block $B_j$ with $j>i$.

Watermarking of Digital Documents

Watermarking of an image, or an image of a document, means here a secret marking of the document in such a way that the presence of the mark can be demonstrated by the owner, who knows the watermarking key, but which otherwise cannot be detected. We assume for simplicity that all documents are 2-dimensional and that they are drawn on a lattice of points colored either by 0 or by 1 (white or black). Typically a document would consist of a large number of lattice points, often exceeding $10^6$. For 3- and higher dimensional 'documents' an extension of the method is straightforward.

The idea of the method is in exploiting quasi-crystal mapping (denoted by ') between a point x of a quasi-crystal $\Sigma(\Omega)$, and its image x' in the acceptance window $\Omega$. Both the quasi-crystal and its acceptance window are now 2-dimensional. In order to keep the terminology intuitive, the acceptance window is called a sheet of paper. It can be of any size and form, and even made of several disconnected pieces. Important is only that its size is finite and that it has an non-empty interior.

From the general theory, it can be shown that if the irrationally is chosen as before $\tau>1>|\tau'|$, say with $\tau=\frac{1}{2}(1+\sqrt{5})$ and $\tau'=\frac{1}{2}(1-\sqrt{5})$, then all the points with coordinates $a+b\tau$, where a and b are integers, will form a 2-dimensional quasi-crystal which is infinite and uniformity discrete and relatively dense. Prime (') is a one-to-one mapping between the quasi-crystal points and the points of $\Sigma'(\Omega)$ on the sheet of paper $\Omega$. In the ideal case the sheet of paper is thus filled densely with the images x' of the infinitely many quasi-crystal points. Practically however, the finite precision of computers allows us to distinguish as different points of the paper, points which are at a distances not less than a certain minimal one. Thus even though the number of points on the sheet may be very large, practically it is always finite. If the sheet of paper contains only a finite number of points (the points of a lattice), then only a finite fragment of the quasi-crystal corresponds to it.

The pertinent property of this mapping ' is that it is everywhere discontinuous, i.e. any two points which are close on one side of the map, are distant on the other side. Thus the closer the lattice points are on the paper, the farther apart the fragment corresponding to them will be, and vice versa. The watermarking of a document would use this property to mark a document by changing only a few non adjacent bits spread all over the document, bits which would then be mapped by onto a small region thus making a visible mark.

Figure 4:
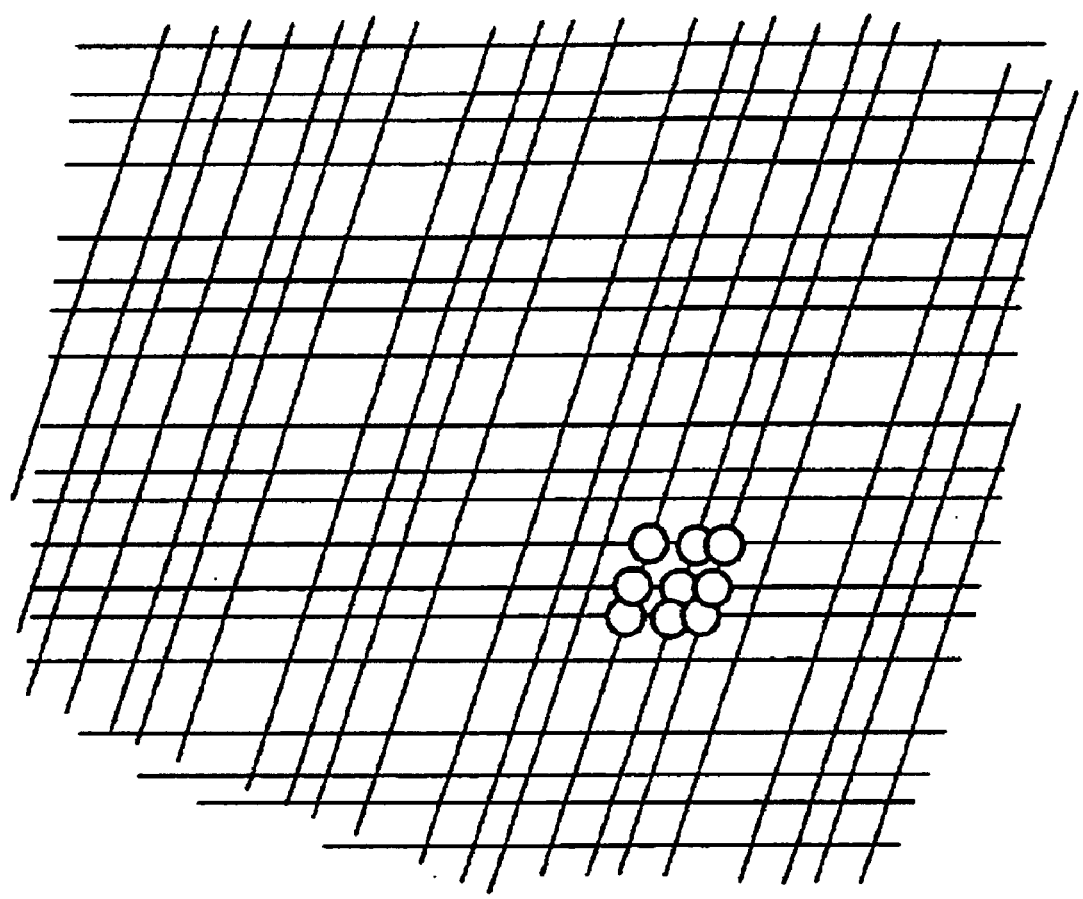
FIG. 4 illustrates a two-dimensional quasi-crystal transformation used in the technique for applying a digital watermark according to a further embodiment of the invention.
Figure 4:
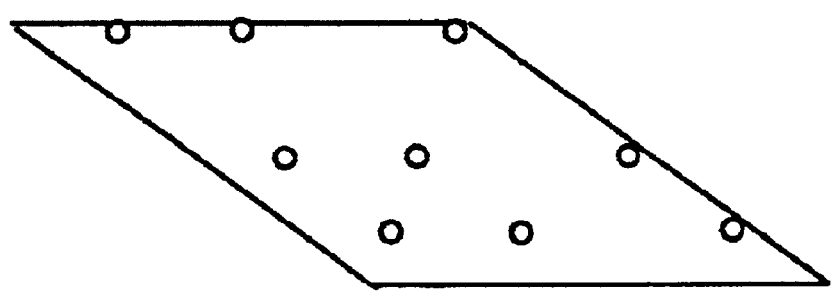

An illustration of the discontinuity of the mapping ' is given in FIG. 4. For simplicity, all points of the quasi-crystal are colored black except 6 points which are all neighbors and colored white. The image of the quasi-crystal by the map ' covers densely the acceptance window, and since all but six points are colored in black, the acceptance window appears black. Magnifying the points in the acceptance window corresponding to white colored points of the quasi-crystal, it is clear that these points are not mapped in the same neighborhood. Moreover, infinitely many black colored points seperate any two white points. Finally, the position of any white point in the acceptance window does not give any information on the position of its image in the quasi-crystal.

One of the watermarking possibilities is to place the digitized document which is to be marked in the sheet of paper $\Omega$ where the lattice points x' are situated. Its points are then identified with the points of a suitably chosen fine lattice on the paper. The color of the points of the document is taken to be the color of the points on the paper and also the color of the corresponding points of the quasi-crystal.

The watermarking starts from the quasi-crystal fragment with points colored by the points of the digitized document which is to carry the watermark.

The process then consists of the following:
1) choosing a subset of points of the colored quasi-crystal which will carry the watermark (in the simplest case these would be adjacent points forming a particular figure or shape);
2) marking the watermark by changing (if needed) the color of these points in a agreed prescribed way (for example making them all black);
3) mapping these points back to the paper while preserving the modified colors.

The points of the watermark will be scattered over the document on the sheet of paper. Given the many points which form the document, the few with modified colors will be difficult to recognize. It is to be understood herein that the points to be changed are bits which are not considered to affect visual properties of an image, and which are easily wiped-out by image processing techniques and/or detectable as being watermark bits. Techniques are known in the art for applying watermarks to digital images and documents. Suitable techniques may be various forms of modulating the watermark information over large areas or hiding it in image boundaries, etc. The present invention may be used in conjunction with such techniques.

Possible attacks on such a watermark:
i) Point-by-point scanning of the documents with and without the watermark and comparing them will show the pints where the colors differ. It is always possible to choose the watermark in such a way that some points of the watermark may not have modified colors. Scanning and comparison approach will miss those points.
ii) In order to decide what is the watermark (i.e. its shape), one would need to be able to find, for every point x' of the watermark, its quasi-crystal image x. However, that is possible only if one knows the absolute coordinates of the points x', i.e. relative to a chosen origin which can be way outside of the document during the design of the watermark.

In order to prove that the a watermark is present, one needs to:
a) know the exact position of the sheet of paper (i.e. coordinates of its points relative to some agreed origin);
b) know the exact position of the document on the sheet of paper;
c) know the position of the watermark in the quasi-crystal.

The condition c) cannot be underestimated, because without it, in a typical case, there would be many tens of thousands of computer screens one would have to test for the presence of the watermark.

There are important choices within this method which are to be made by the designer of the watermark such as the shape, size, position and color of the watermark. Another requirement is its robustness, more precisely the ability of the watermark to survive compression/decompression processes as well as other image processing techniques, as mentioned above.

A simple way to form a 2-dimensional quasi-crystal is to start from two 1-dimensional quasi-crystals, each being oriented in some chosen direction in the plane (more about the orientation later). The desired quasi-crystal is the direct product of the two 1-dimensional quasi-crystal, i.e. every point of one of the quasi-crystals is combined with every point of the other.

The acceptance window of such a 2-dimensional quasi-crystal is the direct product of the two acceptance windows of the 1-dimensional ones. Explicitly that is a rhombus if the 1-dimensional acceptance window were segments (i.e. connected).

In general, one may need to work with quasi-crystals whose acceptance windows are of different shape than a given rhombus. For that, the new window is situated inside a suitably chosen rhombic one, and an additional test is performed on each quasi-crystal point, checking whether its image x' is not only in the rhombic window but also in the new window. Only in the case, the point x' is retained as the point of the new quasi-crystal.

The relative orientation of the two 1-dimensional quasi-crystal, that one decides to use for the watermarking, has some implications which may be not only of practical importance. There are two issues one has to decide (choose):
(i) relative orientation of the 1-dimensional quasi-crystal and (ii) what happens to their orientation when points x are mapped into x' or vice versa. The two choices can be made independently. Some possibilities will be explained with reference to three examples:

I) The simplest choice would be to have the two quasi-crystal oriented perpendicularly to each other and perhaps even using, along each direction, the same 1-dimensional quasi-crystal.

In the next two examples, the two 1-dimensional quasi-crystal are not orthogonally oriented. Their direction is given by two basis vectors, say i and j. The length and relative angles of the basis vectors are conveniently summarized in the matrix G of their scalar products:

$$G = \begin{pmatrix} (i,i) & (i,j) \\ (i,j) & (j,j) \end{pmatrix}$$

where $(i,j)^2 < (i,i)(j,j)$. Note that the example I) could be written in this form with $(i,j)=0$, The diagonal elements in G indicate the normalization of the basis vectors, more precisely they give their square length. The relative orientation of the vectors is the given by the value of the diagonal scalar product $(i,j)$.

A general point x of the quasi-crystal and its image x' are then respectively $$x=(a+b\tau)i+(c+d\tau)j, \quad x'=(a+b\tau')i'+(c+d\tau')j',$$

where a,b,c, and d are integers.

The second issue above is the choice of the matrix G' for given G.

$$G = \begin{pmatrix} (i',i') & (i',j') \\ (i',j') & (j',j') \end{pmatrix}$$

II) Mathematically appealing examples would be the ones where the two issues are resolved as follows:

We choose the three scalar products in G having the values which can be written in the form $p+q\tau$, where p and q are some rational numbers such that the required inequalities $(i,j)^2<(i,j)(j,j)$ are verified.

The matrix G' is then formed from G by replacing $\tau$ by $\tau'$ everywhere.

III) Here G and G' are any symmetric matrices chosen independently and whose matrix elements satisfy the required inequalities.

It will be appreciated that the present invention has been described hereinabove with reference to specific preferred embodiments, and that other embodiments are possible within the scope of the present invention, as defined in the appended claims.

APPENDIX

1. Substitution rules for 1-dimensional cut and project tilings

Here we describe the relation between substitution rules and 1-dimensional quasicrystals. We consider quasicrystals arising from the cut and project scheme with quadratic unitary Pisot numbers $\beta$. For a quasicrystal $\tau(\Omega)$ with a convex acceptance window $\Omega$, we prove that a substitution rule exists, precisely if $\Omega$ has boundary points in the corresponding quadratic held $Q[\beta]$. In this case, one may find for arbitrary quasicrystal point $x \in \Sigma(\Omega)$ a substitution generating the quasicrystal $\Sigma(\Omega)$ starting from x. We provide an algorithm for construction of such a substitution rule.

2. Introduction

A substitution rule is an alphabet, together with a mapping which to each letter of the alphabet assigns a finite word in the alphabet. A fixed point of the substitution is an infinite word $\omega$ which is invariant with respect to the substitution. It can be studied from a combinatorial point of view (configurations of possible finite subwords), or from a geometrical point of view. In the later case we consider the letters of $\omega$ to be tiles of given length put in a prescribed order on the real line. In such a way, the tiling determines a Delone point set $\Lambda \subset R$. (A set $\Lambda \subset R$ is said to satisfy the Delone property if it has uniform lower and upper bounds on the distances between adjacent points.) In order that the set $\Lambda$, obtained from the substitution, has a self-similarity, i.e. that there exists a factor s, that s $\Lambda \subset \Lambda$, one has to choose the tiles to have suitable lengths. It is possible to extend the geometry of substitutions also to higher dimensions to construct for example tilings in the plane [9, 15]. In this paper we limit the consideration to substitution sequences which are 1-dimensional.

Substitution rules may provide a wide variety of structures with different levels of order and randomness [1]. In particular, the substitution sequences may be both periodic or aperiodic. A standard way to construct quasiperiodic point sets is the 'cut and project' method. One of the major applications of cut and project point sets is the modelling of physical quasicrystalline materials. The point sets obtained by the cut and project scheme, called here simply 'quasicrystals', have many remarkable properties. Among them especially the diffraction properties [10] and symmetries are of interest for quasicrystallographers. A very important attribute of cut and project sets is the presence of a rich structure of self-similarities [2,11]. A substitution rule carries a self-similarity factor for the corresponding Delone point set as a Perron-Frobenius eigenvalue of the substitution matrix.

One may ask about the relation of cut and project quasicrystals and Delone sets generated by substitutions. In this paper we provide an answer to this question for large family of 1-dimensional quasicrystals. We decide about the existence of a substitution rule generating the given-quasicrystal, and if there exists one, we give a prescription how to find it.

The connection of substitutive sequences to quasicrystals has been recognized for example by Bombieri and Taylor. In [5] they show that if the characteristic polynomial of the substitution rule is the minimal polynomial of a Pisot number, then the point set given by such a substitution is a subset of a cut and project set. The most frequently mentioned example of the Fibonacci chain constructed by the rule $a \to ab, b \to a$, is a 1-dimensional cut and project quasicrystal, see [5].

Gähler and Klitzing study the Fourier transform of Delone sets generated by substitution rules. They show in [8] that a substitution determines a set with non trival Bragg spectrum iff the largest eigenvalue of the substitution matrix (=scaling factor of the substitution tiling) is a Pisot number.

In this article we study 1-dimensional cut and project sets based on the golden mean irrationality $\tau = \frac{1}{2}(1+\sqrt{5})$. However, our result can be extended for other quadratic unitary Pisot numbers as well. The algebraic definition of cut and project quasicrystals used in this paper (Definition 3.2) follows the analogy of [14]. A quasicrystal is a subset of the ring of integers $Z[\tau]$ of the quadratic field $Q[\sqrt{5}]$. A point $x \in Z[\tau]$ belongs to the quasicrystal if its Galois conjugate x' lies in a chosen 'acceptance interval' $\Omega$.

In order that a Delone set $\Lambda \subset R$ with a finite number of tiles (distance between adjacent points) could be generated from a point $x \in \Lambda$ by a substitution with the eigenvalue s, $\Lambda$ has to satisfy $s(\Lambda - x) \subset \Lambda - x$. (Of course, it is not a sufficient condition for the existence of a substitution rule.) A cut and project quasicrystal $\Sigma$ has the property that for any $\epsilon \Sigma$ there are infinitely many different factors s, such that $s(\epsilon - x) \subset \Sigma - x$. Such points x as centers of scaling symmetry are called s-inflation centers. A complete description of inflation centers is given in [11].

In this article we find necessary and sufficient condition on the acceptance interval $\Omega$ for the existence of a substitution rule which enables to generate the quasicrystal with the acceptance window $\Omega$, starting from a given point x of the quasicrystal. If this condition is satisfied, then for any quasicrystal point y there exists a substitution $\theta_y$, depending on y, which generates the quasicrystal $\Sigma$ from y. Note that the proof of this statement is constructive. We provide an algorithm for construction of the substitution rules for given $\Omega$ and y.

3. Preliminaries

A substitution is a rule that assigns to each letter of an alphabet A a concatenation of letters, which is called a word. The set of words with letters in A is denoted by A*. An iteration of the substitution starting from a single initial letter leads to words of increasing length. Certain assumptions on the substitution rule ensure that the words give raise to an infinite sequence of letters which is invariant with respect to the substitution.

DEFINITION 3.1 Let A be an alphabet. A map $\theta: A^* \to A^*$ is called a substitution, if $\theta(a)$ is non empty for all $a \in A$ and if it satisfies $\theta(\upsilon\omega)=\theta(\upsilon)\theta(\omega)$ for all $\theta$, $\omega \in A^*$. An infinite sequence $u \in A^*$ is called a fixed point of $\theta$, if $\theta(u)=u$.

Let u be a fixed point of a substitution and $\omega: A \to V$ be a mapping of the alphabet A into another alphabet V. The mapping $\omega$ can be extended into $\omega: A^* \to V^*$. The sequence $\theta=\omega(u)$ is called the $\omega$-image of u.

If $\theta: A^* \to A^*$ is a substitution and for a letter $a \in A$, one has $\theta(a)=a\omega$ for some non empty word $\omega \Sigma A^*$, then the sequence of word $\theta^n(a)$ converges to an infinite word u, which is a fixed pint of $\theta$. We use the notation $$u = \xrightarrow{\theta^\infty(a)}.$$

Similarly, if there exists $b \in A$, such that $\theta(b)=\omega b$ for some non empty $\omega \in A^*$, we can construct a bidirectional infinite sequence starting the substitution rule from the pair b|a.

As an example, let us mention the well known Fibonacci substitution rule $\theta$ on the alphabet formed by two letters, $A=\{a, b\}$, given by $a| \to ab$, $b| \to a$. The second iteration of $\theta$ is a substitution $$a| \to aba \; b| \to ab \tag{1}$$

therefore we can generate from the pair b|a a bidirectional infinite word $$\xleftarrow{\theta^\infty(a)} \tag{2}$$

$$\left| \xrightarrow{\theta^\infty(a)} = \ldots abaababaabaababaabab | abaababaabaababaababaa \ldots \right.$$

We can associate lengths to letters a and b, and imagine the infinite sequence (2) as a labeling the tiles of a tiling of R. If we identify each tile with its left end point starting with the deliminator | at the origin, then we obtain a Delone point set $\Lambda \subset R$. Using for a and b the lengths determined by the standard analysis of the corresponding substitution matrix, the Delone set has a self-similarity $s\Lambda \subset \Lambda$, where s is the dominant eigenvalue of the matrix. The suitable lengths of tiles are given as components of the eigenvector associated with s. Consider the substitution of (1). The corresponding matrix, its dominant eigenvalue and the associated eigenvector are given by $$M = \begin{pmatrix} 2 & 1 \\ 1 & 1 \end{pmatrix},$$

$$\lambda = \tau^2,$$

$$\upsilon = \begin{pmatrix} \tau \\ 1 \end{pmatrix},$$

where $\tau$ is the golden mean irrationality. Setting the lengths l(a), l(b) to be $\tau$ and 1, it can be shown that the Delone set arising from the substitution coincides with a 1-dimensional cut and project quasicrystal. The definition is given below.

Let $\tau$ and $\tau'$ be the roots of $x^2=x+1$, i.e. $\tau\tau'=-1$ and $\tau+\tau'=1$. We have $$\tau = \frac{1+\sqrt{5}}{2},$$

$$\tau' = \frac{1-\sqrt{5}}{2}.$$

Recall the ring of integers $Z[\tau]=\{a+b\tau | a, b \in Z\}$ of the quadratic field $Q[\sqrt{5}]$ and the Galois automorphism ' defined by $x'=(a+b\tau)':=a+b\tau'$.

DEFINITION 3.2 Let $\Omega \subset R$ be a bounded interval with non empty interior. A cut and project quasicrystal is the set $$\Sigma(\Omega):=(x \in Z[\tau] | x' \in \Omega).$$

and $\Omega$ is called the acceptance window (interval) of the quasicrystal $\Sigma(\Omega)$.

Let us formulate some of the properties of quasicrystals which will be used in this paper. Their proof is a direct consequence of the definition. It can be found for example in [4]. Note that for (v) one needs to know that $\pm \tau^k$, $k \in Z$, are divisors of unity in the ring $Z[\tau]$, which ensures that $Z[\tau]=\tau^k Z[\tau]$.

LEMMA 3.3. Let $\Omega_1$, $\Omega_2$, and $\Omega \subset R$ be intervals. Then
(i) $\Sigma(\Omega_1) \subset \Sigma(\Omega_2)$ if $\Omega_1 \subset \Omega_2$,
(ii) $\Sigma(\Omega_1) \cap \Sigma(\Omega_2) = \Sigma(\Omega_1 \cap \Omega_2)$,
(iii) $\Sigma(\Omega_1) \cup \Sigma(\Omega_2) = \Sigma(\Omega_1 \cup \Omega_2)$,
(iv) $\Sigma(\Omega)+\eta = \Sigma(\Omega+\eta')$, for any $\eta \in Z[\tau]$,
(v) $\tau^k \Sigma(\Omega) = \Sigma(\tau'^k \Omega)$, for $k \in Z$, Consequently, we shall be interested only in quasicrystals with acceptance windows $\Omega=[c, d)$, such that $1 \leq d-c < \tau$. If the length d-c of $\Omega$ is not within desired bounds, the property (v) of Proposition 3.3 allows us to find geometrically equivalent quasicrystal (rescaling the acceptance window properly), which satisfies the required condition. The restriction made on the interval to be semiclosed, [c, d), may influence only presence or absence of two particular points, namely c' and d' in the quasicrystal. This remark applies, of course, only if c, d belong to $Z[\tau]$. Otherwise, including the boundary of the acceptance interval is not relevant for the quasicrystal. It is obvious that adding or removing a single point to a point set may strongly influence the form of the substitution rule. We deal with this problem in Section 7, providing examples of substitution rules for quasicrystal with closed and open acceptance windows.

Construction of a substitution rule for a given quasicrystal $\Sigma(\Omega)$ from its particular point $x \in \Sigma(\Omega)$ is, according to (iv) a Proposition 3.3, a task equivalent to finding a rule for $\Sigma(\Omega-x')$ starting from 0. Therefore we can limit ourselves for quasicrystals containing the origin, which gives us the conditions $c \leq 0$, $d > 0$, on the acceptance interval $\Omega=[c, d)$.

Further important property of quasicrystals, which will be used in this paper, is formulated in the following proposition. Its proof can be found in [12].

PROPOSITION 3.4. Let $\Omega$ be an interval of length l, $1 \geq l < \tau$. The distances between adjacent points of the quasicrystal $\Sigma(\Omega)$ are 1, $\tau$ and $\tau^2$.

We denote the distances 1, $\tau$ and $\tau^2$ by S (=short), M(=middle) and L (=long) respectively. The letters will stand for both the tiles and their lengths. Following lemma allows to divide the elements of a given quasicrystal into three groups, according to tiles which follow them. The lemma is a straightforward consequence of Proposition 3.4.

LEMMA 3.5. Let c, d $\in R$, $1 \geq d-c < \tau$. The sets $\Sigma_S$, $\Sigma_M$ and $\Sigma_L$ of points of the quasicrystal $\Sigma[c, d)$ which are followed be the distance 1, τ, and τ² respectively, are given by $$\Sigma_S = \{x \in \mathbb{Z}[\tau] \mid x' \in [c, d-1)\},$$

$$\Sigma_M = \left\{x \in \mathbb{Z}[\tau] \mid x' \in \left[c + \frac{1}{\tau}, d\right)\right\},$$

$$\Sigma_L = \left\{x \in \mathbb{Z}[\tau] \mid x' \in \left[d-1, c + \frac{1}{\tau}\right)\right\}.$$

In particular, $\Sigma_S$ is empty if d−c=1.

4. Construction of substitutions—idea and examples

In this Section we explain the main ideas of the paper about the construction of a substitution for a given quasicrystal. We illustrate it on two examples. In the first of them (Example 4.1) we take the well known Fibonacci substitution and explain the fact that the corresponding Delone set is a cut and project quasicrystal. In the second Example 4.2, we start with a chosen quasicrystal and demonstrate the method how to find a substitution rule for it.

A quasicrystal with tiles S, M, L is a bidirectional infinite word in these letters. Fixing a point in a quasicrystal corresponds to fixing the delimiter | between two particular letters of word. Construction of a substitution for such quasicrystal with respect to a chosen point stems in finding a rule θ, such that the word of the quasicrystal with a given delimiter |, is its fixed point. We show that only for a certain family of quasicrystals it is possible to find a substitution rule having the alphabet with three letters (S, M, L), (Proposition 6.2). For other quasicrystals, the tiles can be divided into groups $S_1, \ldots, S_{k_S}, M_1, \ldots, M_{k_M}$, and $L_1, \ldots, L_{k_L}$. Then there exits a substitution θ with alphabet $A=(S_1, \ldots, L_{k_L})$ such that the quasicrystal is its fixed point. More formally, it is possible to find a substitution θ with an alphabet A and a mapping ω: A→(S, M, L) such that the quasicrystal is an ω-image of some fixed point of θ.

We shall construct the substitution rule by dividing the short, middle and long distances into several groups in such a way that tiles in one group are, after rescaling by the factor τ², filled by the same sequence of distances. It is illustrated on FIG. 5.

Determination of points followed by tiles of length S, M, or L consists, according to Lemma 3,5, in splitting the acceptance window of the quasicrystal into three disjoint subintervals. Similarly, determination of points followed by $S_1, \ldots, S_{k_S}, M_1, \ldots, M_{k_M}$, or $L_1, \ldots, L_{kL}$ corresponds to a splitting of the acceptance window Ω into $k_s+k_M+k_L$ disjoint intervals $\Omega_1, \ldots \Omega_{k^L}$. We show that two quasicrystal points which have their ' image in the same subinterval $\Omega_i$ are, after rescaling by τ², followed by the same sequence of distances filling the corresponding tile $S_i$, $M_i$, or $L_i$. The points determining the division Ω into $\Omega_i$'s are called splitting points. We provide an explicite prescription for finding the splitting. It is obvious that if one has a substitution for a given quasicrystal and its point, then it is possible to find another substitution with larger alphabet for the same scaling factor. For example instead of a letter a we may write $a_1$, $a_2$ in a random order. Our division of Ω using splitting points provides a substitution rule with minimal alphabet for the scaling factor τ².

It can be recognized from the form of the acceptance window Ω, whether the set of splitting points is finite or infinite, see Proposition 5.9. If it is infinite, then for a given quasicrystal a substitution rule with factor τ² does not exist. We show that then one cannot find neither a substitution with another scaling factor, (Theorem 5.10).

If the set of splitting points is finite, we give an estimate on the number of letters of the alphabet, dependingly of the acceptance interval Ω. The size of the alphabet may be reduced using another factor, for example by iteration of the given substitution. This prolonges the word design to a single letter by the substitution. In Section 6 we describe those quasicrystals where a suitable iteration $\theta^P$ of a substitution rule θ with factor τ² gives a rule with 3-letter alphabet (S, M, L).

Figure 5:
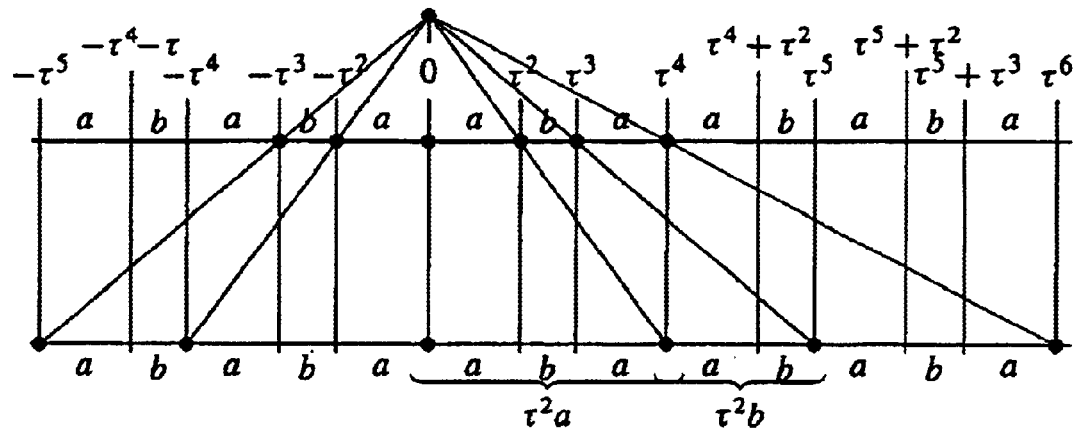
FIG. 5 illustrates the construction of substitution rules in accordance with the preferred embodiment.

EXAMPLE 4.1 Recall the Fibonacci substitution rule (1). Consider the letters a, b in its fixed point (2) to be tiles dividing the real axis. Set the length of the tile represented by a to be τ², and the length of the tile b to τ. Let us show that the tiling sequence $$\overset{\theta^\infty(a)}{\longleftarrow} \mid \overset{\theta^\infty(a)}{\longrightarrow}$$

produces the quasicrystal $\Sigma[-1/\tau^2, 1/\tau)$. The procedure is illustrated in FIG. 5. We shall use the self-similarity property (v) of Lemma 3.3, $$\tau^2 \Sigma\left[-\frac{1}{\tau^2}, \frac{1}{\tau}\right) = \Sigma\left[-\frac{1}{\tau^4}, \frac{1}{\tau^3}\right) \subset \Sigma\left[-\frac{1}{\tau^2}, \frac{1}{\tau}\right).$$

The last inclusion is valid due to (i) of the lemma. All together this means that the quasicrystal point set rescaled with respect to 0 by the scaling factor τ² is subset of the original quasicrystal. The quasicrystal $\Sigma[-1/\tau^4, 1/\tau^3)$ has the same ordering of tiles as $\Sigma[-1/\tau^2, 1/\tau)$, but the lengths are τ² times rescaled, i.e. τ⁴ and τ³. The points of $\Sigma[-1/\tau^2, 1/\tau)$ divide the tiles of $\Sigma[-1/\tau^4, 1/\tau^3)$. Clearly, the rescaled tiles (lengths τ⁴, τ³) are divided into tiles of lengths τ² and τ. It is possible to do only in such a way, that $\tau^4=2\tau^2+\tau$ is cut into two of length τ² and one of length τ, similarly the tile of length τ³ splits into one of length τ², and one of length τ (recall that $\tau^3=\tau^2+\tau$). Therefore the longer tile a after rescaling is replaced by the concatenation of twice a and b, the rescaled b becomes a concatenation of a and b. We will show that each of letters a are replaced by a, b, a in the same order, and similarly for the replacement of b, i.e. we will show that $\Sigma(-1/\tau^2, 1/\tau)$ is generated by the substitution θ(a)=aba, θ(b)=ab.

Note that the substitution θ is given by the action of several affine mappings. First, we rescale the points by the factor τ². It corresponds to the mapping $t_{(1)}x:=\tau^2 x$. Then we split the enlarged tiles by adding new points into them. Let x be followed by the tile a. The splitting of the enlarged tile with left end point τ²x according to θ(a)=aba means to insert new successors to the point τ²x, by mappings $$t_{(2)}x:=\tau^2 x+\tau^2,$$

$$t_{(3)}x:=\tau^2 x+\tau^2+\tau.$$

Let now y be followed by the tile b. The splitting of the rescaled tile b with the left end point being $t_{(1)}y=\tau^2 y$ according to θ(b)=ab is done by adding one new point $\tau_{(2)}y:=\tau^2 y+\tau^2$.

Now it is important to decide, which quasicrystal points are left end points of tiles a with length τ², and which of them are left end points of tiles of the type b with length τ. Using Lemma 3.5 for the given quasicrystal $\Sigma[-1/\tau^2, 1/\tau)$ we find that $y \in \Sigma_M = \Sigma[1/\tau^3, 1/\tau)$ are left end points of tiles b and $x \in \Sigma_L = \Sigma[-1/\tau^2, 1/\tau^3)$ are the left end points of tiles a.

In order to show that the substitution θ generates our quasicrystal we have to prove that $$\Sigma\left[-\frac{1}{\tau^2}, \frac{1}{\tau}\right) = t_{(1)}\Sigma_M \cup t_{(2)}\Sigma_M \cup t_{(1)}\Sigma_L \cup t_{(2)}\Sigma_L \cup t_{(3)}\Sigma_L. \quad (3)$$

Applying (iv) and (v) of Lemma 3.3, we obtain $$t_{(1)}\Sigma_M = \tau^2\Sigma_M = \Sigma\left[\frac{1}{\tau^5}, \frac{1}{\tau^3}\right)$$

$$t_{(1)}\Sigma_L = \tau^2\Sigma_L = \Sigma\left[-\frac{1}{\tau^4}, \frac{1}{\tau^5}\right)$$

$$t_{(2)}\Sigma_M = \tau^2\Sigma_M + \tau^{2'} = \Sigma\left[\frac{1}{\tau^5}\frac{1}{\tau^2}, \frac{1}{\tau}\right)$$

$$t_{(2)}\Sigma_L = \tau^2\Sigma_L + \tau^2 = \Sigma\left[\frac{1}{\tau^3}, \frac{1}{\tau^5} + \frac{1}{\tau^2}\right)$$

$$t_{(3)}\Sigma_L = \tau^2\Sigma_L + \tau^3 = \Sigma\left[-\frac{1}{\tau^2}, -\frac{1}{\tau^4}\right)$$

The statement (iii) of Proposition 3.3 then gives us the result (3).

In the previous example we have shown how the Fibonacci substitution (1) generates the 2-tile quasicrystal $\Sigma[-1/\tau^2, 1/\tau)$. In the following example we find a substitution rule for the 3-tile quasicrystal $\Sigma[0, 1+1/\tau^2)$. Although the quasicrystal has only three types of tiles, we will use an alphabet formed by four letters. It will be clear that with the chosen scaling factor $\tau^2$, one cannot find a substitution rule with smaller alphabet.

EXAMPLE 4.2. Let us split the acceptance window $\Omega=[0, 1+1/\tau^2)$ into intervals $\Omega_i, i=1, \ldots, 4$ as follows.

$$\Omega_1=[0, 1/\tau^2), \Omega_2=[1/\tau^2, 1/\tau), \Omega_3=[1/\tau, 1), \Omega_4=[1,1+1/\tau^2).$$

Recall the sets $\Sigma_S$, $\Sigma_L$, and $\Sigma_M$ of points followed by the tile S, M, L, respectively, (cf. Lemma 3.5). We have $\Sigma_S=\Sigma(\Omega_1)$, $\Sigma_L\Sigma(\Omega_2)$, $\Sigma_M=\Sigma(\Omega_3)\cup\Sigma(\Omega_4)$. Let us assign the letters to intervals $\Omega_i$, S to $\Omega_1$, L to $\Omega_2$, $M_1$ to $\Omega_3$, and $M_2$ to $\Omega_4$. In the construction of the substitution for our quasicrystal, we proceed in the following way: We stretch the quasicrystal by the factor $\tau^2$ with respect to the origin. We obtain the quasicrystal $\tau^2\Sigma[0, 1+1/\tau^2)=\Sigma[0, 1/\tau^2, +1/\tau^4) \subset \Sigma[0,1+1/\tau^2)$. The tiles of the stretched quasicrystal have lengths $\tau^2$ times greater than S, M, L, namely $\tau^2$, $\tau^3$, and $\tau^4$.

Let us take the left end points $y^I$ of a stretched tile with length $\tau^2 S=\tau^2$. We shall look for right neighbours $y^{II}, y^{III}, \ldots$ of $y^I$ in $\Sigma[0,1'+1/\tau^2)$, which fill the corresponding tile $\tau^2 S$. We have $y^I \in \tau^2 \Sigma s$. Therefore the ' image $x=(y^I)'$ belongs to $1/\tau^2 \Omega_1$. Since $1/\tau^2 \Omega_1 \subset \Omega_1$, the point $y^I$ belongs to $\Sigma_S$, and thus its smallest right neighbor in $\Sigma(\Omega)$ is the point $y^{II}=y^I+S$. Therefore $(y^{II})' \in 1/\tau^2\Omega_1+1 \subset \Omega_4$. This means that $y^{II} \in \Sigma_M$. Its smallest right neighbour is $y^{III}=y^{II}+M_2$. We have $(y^{III})' \in 1/\tau^2\Omega_1+1-1/\tau \subset 1/\tau^2\Omega$. Thus $y^{III}$ is the right end point of the stretched tile $\tau^2 S$. Symbolically it can be written as $$S:\left[0, \frac{1}{\tau^4}\right) \xrightarrow{S} \left[1, 1+\frac{1}{\tau^4}\right) \xrightarrow{M_2} \left[\frac{1}{\tau^2}, \frac{1}{\tau^2}+\frac{1}{\tau^4}\right) \subset \frac{1}{\tau^2}\Omega.$$

We see that a stretched tile $\tau^2 S$ is filled by tiles S and $M_2$, respectively. Formally, we have the rule $S \to SM_2$.

Similarly we can proceed for left end points of other stretched tiles. It suffices to realize that the ' images of the left end points of stretched tiles $\tau^2 L$ belong to $1/\tau^2\Omega_2=[1/\tau^4, 1/\tau^3)$. For left end points of $\tau^2 M_1$ we have $1/\tau^2\Omega_3=[1/\tau^3, 1/\tau^2)$, and for $\tau^2 M_2$ we have $1/\tau^2\Omega_4=[1/\tau^2, 1/\tau^2+1/\tau^4)$. The filling of the stretched tiles is schematically described by the following formulas and illustrated on FIG. 6.

$$L:\left[\frac{1}{\tau^4}, \frac{1}{\tau^3}\right) \xrightarrow{S} \left[1+\frac{1}{\tau^4}, 1+\frac{1}{\tau^3}\right) \xrightarrow{M_2} \left[\frac{1}{\tau^2}+\frac{1}{\tau^4},$$

$$\left.\frac{1}{\tau}\right) \xrightarrow{L} \left[\frac{2}{\tau^2}+\frac{1}{\tau^4}, 1\right) \xrightarrow{M_1} \left[\frac{1}{\tau^3}+\frac{1}{\tau^6}, \frac{1}{\tau^2}\right) \subset \frac{1}{\tau^2}\Omega.$$

$$M_1:\left[\frac{1}{\tau^3}, \frac{1}{\tau^2}\right) \xrightarrow{S} \left[1+\frac{1}{\tau^3}, 1+\frac{1}{\tau^2}\right) \xrightarrow{M_2} \left[\frac{1}{\tau}, \frac{2}{\tau^2}\right) \xrightarrow{M_1} \left[0, \frac{1}{\tau^4}\right) \subset \frac{1}{\tau^2}\Omega.$$

$$M_2:\left[\frac{1}{\tau^2}, \frac{1}{\tau^2}+\frac{1}{\tau^4}\right) \xrightarrow{L} \left[\frac{2}{\tau^2}, \frac{2}{\tau^2}+\frac{1}{\tau^4}\right) \xrightarrow{M_1} \left[\frac{1}{\tau^4}, \frac{1}{\tau^3}+\frac{1}{\tau^6}\right) \subset \frac{1}{\tau^2}\Omega.$$

Figure 6:
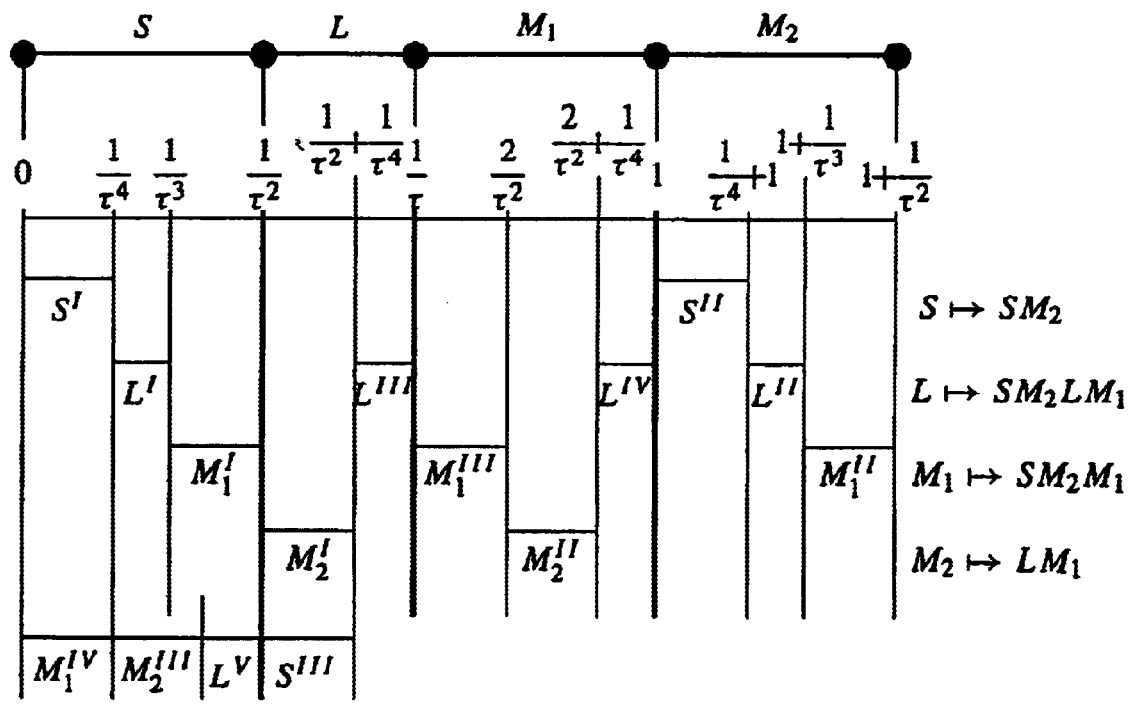
FIG. 6 illustrates schematically the construction of a substitution rule for the quasi-crystal $\Sigma[0,1+1/\tau^2)$.

Let us now make several comments to the table on FIG. 6. We can see that always the first and the last iterations of a given letter X, (X ∈(S, L, $M_1$, $M_2$)), belong to $1/\tau^2\Omega$. The second up to last iterations $X^{II}$, $X^{III}$, ... of all letters together cover disjointly the entire acceptance window $\Omega$. Note that the first iteration $X^I$ divide the interval $1/\tau^2$ $\Omega$ in a way different to the division by the last iteration of letters. The points of $X^I$ correspond to left end points of stretched tiles $\tau^2 X$, and the points of last iterations correspond to right end points of the stretched tiles $\tau^2 X$. Note that it was necessary to split M into $M_1$ and $M_2$, since points from $M_1^I$ and $M_2^I$ jump according to different prescriptions.

5. Justification of the method

In the previous Section, we have explained on examples the steps which have to be done, in order to construct a substitution rule for a given quasicrystal. In this Section, we provide an algorithm for finding a suitable splitting of the acceptance window to groups of points which are assigned by the same letter. We shall justificate the procedure of construction of the substitution rules from such splittings, illustrated in Example 4.2.

Throughout this Section, we shall consider the acceptance window $\Omega=[c, d)$, where $c \geq 0$, $d>0$, $1 \geq d-c < \tau$. Using Lemma 3.5 above, we are able to give a prescription, how to generate, one after another, the points of a quasicrystal. In each step we go from a point $y \in \Sigma[c, d)$ to its closest right neighbour in $\Sigma[c, d)$. Considering the same procedures for ' images of points $x=y'$ in the acceptance window, we may define a function $f:\Omega \to \Omega$ by $$f(x) := \begin{cases} x+1 & \text{for } x \in [c, d-1), \\ x-\frac{1}{\tau} & \text{for } x \in \left[c+\frac{1}{\tau}, d\right), \\ x+\frac{1}{\tau^2} & \text{for } x \in \left[d-1, c+\frac{1}{\tau}\right). \end{cases} \quad (4)$$

In this notation, the closest right neighbour of a quasicrystal point y is $(f(y'))'$. Generally, the k-th neighbour of y is $(f^{(k)}(y'))'$. Note that the function is in fact defined not only for numbers in Z $[\tau]$, but for all $x \in [c, d)$. In that case the function $f$ does not correspond to motion in the quasicrystal. If $x \in Z [\tau[$, also $f(x)$ belongs to $Z[\tau]$. Moreover, if $x \in \frac{1}{q}Z[\tau]$, q ∈N, also $f(x) \in \frac{1}{q}Z[\tau]$. Whenever, $x \in Q[\tau]$, it means that its ' image x' is defined, we have $$x'+1 \geq (f(x))' \geq '+\tau^2. \quad (5)$$

Let us denote by Dense the quasicrystal Dense=$\Sigma(\Omega)$, and by Sparse its $\tau^2$-times enlarged copy Sparse=$\tau^2\Sigma(\Omega)=\Sigma(1/\tau^2\Omega)$. Clearly, Sparse ⊂ Dense. Walking on points of Dense from left to right step-by-step, we come time to time to a point which belongs also to Sparse. Since the tiles in Dense are of lengths 1, τ and τ², and distances in Sparse are τ², τ³, and τ⁴=3τ+2, the number of steps needed to move from one point of Sparse to another one is ≦5. On the other hand, any point y from Dense either belongs to Sparse, or we arrive to y from a point in Sparse after at most 4 steps. Since the corresponding motion in the acceptance window Ω is described by iterations of the function f, we can formulate previous transparent observations into the following propositions.

Proposition 5.1. For any x∈1/τ²Ω there exists a positive integer n(x)≦5, such that $$f^{(n(x))}(x) \in \frac{1}{\tau^2}\Omega.$$

Proposition 5.2. For any y∈Ω1/τ²Ω there exists a unique x∈1/τ²Ω, and a unique 0≦i<n(x) such that $f^{(i)}(x)=y$, The considerations carried before the formulation of the above propositions prove the assertions only for x, y∈Z[τ]. The proof for x, y∉Z[τ] follows from the fact that Z[τ]∩Ω is dense in Ω and f is right continuous on Ω.

The function f is bijective, therefore the inverse $f^{(-1)}$ is well defined. Thus for a given y∈Ω, the x from Proposition 5.2 can be found by iteration of $f^{(-1)}$. Let us define a function g:Ω→Ω by the prescription $$g(y):=\tau^2 f^{(-i)}(y), \qquad (6)$$

where i is the minimal non negative integer such that $f^{(-i)}(y) \in 1/\tau^2\Omega$. Note that 0≦i≦4, due to Propositions 5,1 and 5.2.

Assume that we have a substitution rule with the scaling factor s, whose fixed point is the given quasicrystal Σ[Ω]. The prescription of the substitution corresponds to filling of the tiles sS, sL, sM of the stretched quasicrystal sΣ[Ω], by the tiles of the original Σ[Ω], according to the function f. Consider two points x, y∈Σ[Ω] followed by tiles which are assigned with the same letter, say a. It means that in an arbitrary iteration, say k-th, of the substitution, the $s^k$ times stretched tiles, following the points $s^k x$ and $s^k y$ are filled by the same sequence of distances. This implies that the iterations of the function f behave in the same way on points $(s^k x)'$, $(s^k y)'$. It means that for any z∈Σ[Ω], such that x'<z'<y', the function f behaves in the same way, and therefore we can assign the file following z by the letter a. Without loss of generality, we may assume that the points assigned to the same letter form an interval in Ω∩Z[τ]. The acceptance window Ω is split into a finite disjoint union of intervals, corresponding to letters of the alphabet.

The above considerations lead us to the following definition.

Definition 5.3. Let $\alpha_0, \alpha_1, \ldots, \alpha_k$ be points such that $c=\alpha_0 < \alpha_1 < \ldots, \alpha_k = d$, and there exist $k_s, k_L, 0 \leq k_s < k_L < k$, for which $\alpha_{k_s} = d - 1$ and $\alpha_{k_L} = c + 1/\tau$. We denote by Ω the intervals $\Omega_i := [\alpha_{i-1}, \alpha_i)$, i=1, ..., k. The points $\alpha_i$=0, ..., k-1, are called the splitting points. We define a mapping φ:Ω→A, where A is an alphabet A={$a_1, a_2, \ldots, a_k$}, by $$\phi(x) = a_i \iff x \in \Omega_i.$$

Further, we define a mapping w:Ω/τ²→A*, which to any x∈Ω₁/τ² associates the word $$w(x) = \phi(z)\phi(f(x))\phi(f^{(2)}(x)) \ldots \phi(f^{(n(x)-1)}(x)).$$

We say that a splitting $\Omega_1, \ldots, \Omega_k$, corresponding to splitting points $\alpha_0, \alpha 1, \ldots, \alpha_{k-1}$, is proper, if the mapping w is constant on each $\Omega_i/\tau^2$. The word w(x), common for all x∈Ω$_i$/τ² is denoted by $w_1$. A proper splitting defines naturally a substitution rule ζ: A→A* by $\delta(a_i)=w_1$.

Let as make several remarks to the definition above:

Remark 5.4.

1. A splitting $\Omega_1, \ldots, \Omega_k$ is proper, if and only if for all 1≦i≦k, the following is true: For any x∈Ω/τ² there is a common value of n(x)=: $n_i$, and there exist indices $s_0, s_1, \ldots, s_{ni-1}$ such that $$\frac{1}{\tau^2}\Omega_i \subset \Omega_{s_0}, f\left(\frac{1}{\tau^2\Omega_i}\right) \subset \Omega_{s_1}, f^{(2)}\left(\frac{1}{\tau^2}\Omega_i\right) \subset \Omega_{s_2}, \ldots,$$

$$f^{(n_i-1)}\left(\frac{1}{\tau^2}\Omega_i\right) \subset \Omega_{s_{n_i-1}}.$$

For any 1≦i≦k, the interval $\Omega_i$ is a subset of either [c, d−1), or [c+1/τ, d), or [d−1, c+1/τ). Thus the function f is continuous on each of the intervals $\Omega_i$. It means that $1/\tau^2\Omega_i \subset \Omega_{s_0}$, being an interval implies that $f(1/\tau\Omega_i) \subset \Omega_{s_i}$ is an interval. Similarly, images $f^{(i)}(1/\tau^2\Omega_i)$ of $1/\tau^2\Omega_i$ under all iterations of f are intervals.

3. Note that if 0 belongs to $\Omega_{j_0}$ for some $j_0$, then $\Phi(0) = a_{j_0}$ and therefore the word w(0) starts with $a_{j_0}$. Since 0 belongs also to the interval $1/\tau^2\Omega_{j_0}$, and w is constant on $1/\tau^2\Omega_{j_0}$, one has $w(0) = w_{j_0} = \zeta(a_{j_0})$. Similarly, let $z=f^{(-1)}(0)$, i.e. z' is the predecessor of 0 in Dense. Denote by $i_0$ the index for which $z \in \Omega_{i_0}$. Since $f^{(n_{i_0}-1)}(tz/\tau^2)=z$, the word $w(z) = w_{i_0} = \zeta(a_{i_0})$ ends with $a_{i_0}$.

Definition 5.5. We say that a substitution θ with the alphabet B={$b_1, \ldots, b_k$} generates the quasicrystal Σ[c, d) from 0, if there exist indices $i_0, j_0 \in \{1, \ldots, k\}$, such that $$\overleftarrow{\theta^\infty(b_{i_0})} \mid \overrightarrow{\theta^\infty(b_{j_0})}$$

is a fixed point of the substitution θ, and it is possible to assign lengths to letters $b_1, \ldots, b_k$ in such a way that the Delone set corresponding to the bidirectional infinite word $$\overleftarrow{\theta^\infty(b_{i_0})} \mid \overrightarrow{\theta^\infty(b_{j_0})},$$

with the delimiter | fixed at the origin, is the quasicrystal Σ[c, d).

Remark 5.6. Suppose that we have a proper splitting of the acceptance window Ω1. This splitting assigns the letters, say $a_{j_0}, a_{i_0}$, to the origin and its predecessor in the quasicrystal. According to point 3 of Remark 5.4, for the substitution ζ given by a proper splitting, we have $\zeta(a_{j_0})=a_{j_0}w$, for some w∈A*, and $\zeta(a_{i_0})=\overline{w}a_{i_0}$, for some $\overline{w}$∈A*. Therefore $$\overleftarrow{\zeta^\infty(a_{i_0})} \mid \overrightarrow{\zeta^\infty(a_{j_0})}$$

is a fixed point of the substitution ζ. If we assign to letters $a_1, \ldots, a_{k_s}$, the length l, to letters $a_{k_{s-1}}, \ldots, a_{k_L}$, the length $\tau^2$, and to letters $a_{k_L}, \ldots, a_k$, the length τ, the fixed point is the quasicrystal ε(Ω).

The entire quasicrystal Dense may arise by filling the distances in Sparse correctly (according to the function f) by tiles of Dense. It means that except of the points of Sparse, we take also a suitable number of their right neighbours in Dense. A point y of Sparse corresponds to x∈1/τ²Ω∩Z[τ], where x=y'=$f^{(0)}$(x). The neighbours of y correspond to points f(x), $f^{(2)}(x), \ldots, f^{(n(x)-1)}(x)$ in the acceptance window. Recall that the function n(x) is constant on the intervals 1/τ²$\Omega_j$ of a proper splitting, i.e. we can denote n(x)=nj, for any x∈1/τ²$\Omega_j$.

Therefore we have the disjoint union $$\bigcup_{j=1}^{k} \bigcup_{i=0}^{n_j-1} f^{(i)}\left(\frac{1}{\tau^2}\Omega_j \cap \mathbb{Z}[\tau]\right) = \Omega \cap \mathbb{Z}[\tau].$$

From the right continuity of the function f, we may write also $$\bigcup_{j=1}^{k} \bigcup_{i=0}^{n_j-1} f^{(i)}\left(\frac{1}{\tau^2}\Omega_j\right) = \Omega,$$

where again the union is disjoint. According to point 1 of Remark 5.4, all splitting points are boundary points of some of the intervals $f^{(i)}(1/\tau^2 \Omega_j)$. Let now the splitting point a, be a boundary of an interval $f^{(i)}(1/\tau^2\Omega_j) = [\alpha_r, \epsilon)$, for some $1 \leq j \leq k$ and $0 \leq i \leq n_j - 1$. Then $1/\tau^2[\alpha_{j-1}, \alpha_j) = f^{(-i)}[\alpha_r, \zeta)$, and hence $\alpha_{j-1} = \tau^2 f^{(-1)}(\alpha_r)$. Note that $$\tau^2 f(\alpha_r)(\alpha_r) = g(\alpha_r) = \alpha_{j-1}, \qquad (7)$$

where g was defined by (6). The following properties of g will be important.

Remark 5.7.
1. For $x \in \mathbb{Z}[\tau]$, $g(x)$ is also in element of $\mathbb{Z}[\tau]$, i.e. If $x' \in \Sigma(\Omega)$, we have $(g(x))' \in \Sigma[\Omega]$.
2. If $x \in 1/\tau^2 \Omega$, then $g(x) = \tau^2 x$.
3. $g(c + 1/\tau) = g(c)$.
4. Note that the equation (7) says that the set of splitting points is invariant with respect to g.

Proposition 5.8. Let the see $\Gamma$ of splitting points of $\Omega$ be finite. Then the splitting is proper, if and only if $\Gamma$ is invariant with respect to g.

Proof. The implication $\Rightarrow$ is done by 4 of Remark 5.7. For the other implication ($\Leftarrow$) recall that splitting points are always boundary points of intervals $f^{(i)}(1/\tau^2\Omega_j)$, and therefore the entire interval $f^{(i)}1/\tau^2\Omega_j)$ is situated between splitting points. This implies that $f^{(i)}(1/\tau^2\Omega_j)$ belongs to some $\Omega_p$. According to point 1 of Remark 5.4, this has to say that the splitting is proper.

Proposition 5.9. Let $\Omega = [c, d)$, c, $d \in Q[\tau]$. Then the set $$\Gamma_1 \cup \Gamma_2 := \left\{g^{(j)}\left(c + \frac{1}{\tau}\right) \middle| j \in \mathbb{N}_0\right\} \cup \{g^{(j)}(d-1) \middle| j \in \mathbb{N}_0\} \qquad (8)$$

is finite.

Note $c + 1/\tau$ and $d - 1$ have to be splitting points according to the definition. The set $\Gamma_1 \cup \Gamma_2$ is the minimal set invariant with respect to the function g, which contains $c + 1/\tau$ and $d - 1$.

Proof. We prove that $\Gamma_1$ is finite, similar argumentation then can be used to show that also $\Gamma_2$ is finite. Denote the sequence of points $\gamma_j := g^{(j)}(c + 1/\tau)$. Note that $\gamma_0 = c + 1/\tau$, and thus $\gamma'_0 = c' - \tau$. For all j, the point $\gamma_j \in c, d)$.

From the relation (5), it follows that for any $x \in Q[\tau] \cap [c, d)$ one has $$x' - r\tau^2 \leq (f^{(-r)}(x))' \leq x', \text{ for } r \geq 0.$$

Using the definition of functions f and g and the inequality above, one has $$\gamma'_{j-1} - 4\tau^2 \leq \tau^2(g(\gamma_{j-1}))' = \tau^2 \gamma'_j = (f^{(-1)}(\gamma_{j-1}))' \leq \gamma'_{j-1}.$$

(Note that the index i comes from the definition of g in (6) and is always less or equal to 4.) By induction it is easy to show the following inequality for $j = 1, 2, \ldots,$ $$\frac{1}{\tau^{2j}} \gamma'_0 - 4\tau \leq \gamma'_j \leq \frac{1}{\tau^{2j}} \gamma'_0.$$

Now $c \in Q[\tau]$, thus there exists $q \in \mathbb{N}$, such that $cv \frac{1}{q}\mathbb{Z}[\tau]$, and according to properties of f and g, also $\gamma_j \in \frac{1}{q}\mathbb{Z}[\tau]$. Since $\tau_j \in [c, d)$, we have $q\gamma_j \in [qc, qd)$. Thus $q\gamma_j \in [qc, qd) \cap \mathbb{Z}[\tau]$, i.e. $(q\gamma_j)' = g\gamma'_j$ belongs to the quasicrystal $\Sigma[qc, qd)$. Such set is Delone and therefore in a bounded interval$_1$, it has only finitely many points. It follows from (9) that $$q(-|c' - \tau| - 4\tau) \leq q\left(\frac{1}{\tau^{2j}}(c' - \tau) - 4\tau\right) \leq q\gamma'_j \leq \frac{q}{\tau^{2j}}(c' - \tau) \leq q|c' - \tau|.$$

Therefore $g\gamma'_j$ belongs to $(-q|c' - \tau| - 4q\tau, q|c' - \tau|)$, and we can conclude that them are only finitely many values in the set $\Gamma_1$.

Denote $\delta_j := g(j)(d-1)$. This sequence has similar properties as $\tau_j$ and therefore also the set $\Gamma_2 = \{\delta_j | j \in \mathbb{N}_0\}$ is finite.

The previous proposition states that there are only finitely many splitting points. Their number determines the cardinality of the alphabet in the substitution. To estimate it, one uses the ideas of the above proof, see Section 6.

The main result of the paper,

Theorem 5.10. There exists an alphabet $A = \{a_1, \ldots, a_k\}$, $k \geq 2$, and a substitution $\theta: A^* \to A^*$, reproducing the quasicrystal $\Sigma[c, d)$ starting from 0 if and only if c, $d \in Q[\tau]$.

Proof. If c, $d \in Q[\tau]$, the substitution exists. We construct the set $\Gamma \cup \Gamma_2$, which is a proper splitting of $\Omega$, according to Propositions 5,8 and 5.9. It was shown in Remark 5.6, that a proper splitting of the acceptance window defines a substitution with a finite alphabet, which generates the quasicrystal $\Sigma[\Omega)$ starting from the origin.

From the other hand, suppose that there exists a substitution rule $\theta$ with an alphabet $A = \{a_1, \ldots, a_k\}$, generating the quasicrystal $\Sigma[\Omega)$. Necessarily, the Perron-Frobenius eigenvalue s of the substitution (scaling factor of the quasicrystal) belongs to $\mathbb{Z}[\tau]$, and is in absolute value greater than 1. Without loss of generality we may assume that $s > 1$, otherwise we consider the second iterate of $\theta$, which has the eigenvalue $s^2$. Since $s\Sigma[\Omega) \subset \Sigma[\Omega)$, we have $s'\Omega \subset \Omega$, and thus $|s'| < 1$. Note that $s\Sigma[\Omega) = \Sigma[s'\Omega) \cap (s\mathbb{Z}[\tau])$.

The substitution determines a splitting of $\Omega$ into k intervals according to letters $a_1, \ldots, a_k$ of the alphabet. Let us denote the splitting points by $c = \alpha_0 < \alpha_1 < \alpha_2 < \ldots < \alpha_k = d$. Similarly as in Example 4.1, the substitution corresponds to the action of a finite number of affine mappings $$t_{(j)}x := sx + p_j,$$

where s is the scaling factor and $p_j$ is a translation in $\mathbb{Z}[\tau]$. Corresponding action in the acceptance window is done by mappings $$t^*_{(j)}x := s'x + p'_j.$$

For the substitution of a particular letter $a_i$ we use only certain of the mappings $t_{(j)}$. For those $t_{(j)}$, there exists an index n, such that $$t^*_{(j)}(s'(\Omega_i \cap \mathbb{Z}[\tau])) \subset \Omega_n. \qquad (10)$$

Since the substitution $\theta$ generates from $s\Sigma[\Omega)$ the entire quasicrystal $\Sigma[\Omega)$, necessarily $$\Omega \cap \mathbb{Z}[\tau] = \bigcup_{j,i} t'_{(j)}(s'(\Omega_i \cap \mathbb{Z}[\tau])), \tag{11}$$

where this is a disjoint union over suitable Indices i, j. From (10) and (11) we find that for any splitting point $a_j$, j=0, 1, ..., k, there exists an $a_i$, i=0,1, ..., k, and an index $r_{i,j}$, such that $$a_i = s'\alpha_j + p'_{r_{i,j}}.$$

The latter is a system of linear equations with parameters $p'_r$, $di$ $1,j$ for the variables $\alpha_i$, i=0, ..., k. The matrix of the system is diagonally dominant and his entries in $\mathbb{Z}[\tau]$. Such a system of linear equations has a unique solution $(\alpha_0, ..., \alpha_k)$ given by the Cramer's rule, i.e. each $\alpha_i$ equals to the ratio of two determinants with values in $\mathbb{Z}[\tau]$. Therefore $\alpha_i \in Q[\tau]$ for i=0, ..., k. In particular, both $c=\alpha_0$ and $d=\alpha_k$ belong to $Q[\tau]$.

Finding a substitution for $\Sigma[\Omega]$ from its point x is equivalent to finding a rule for $\Sigma[\Omega-x']$ from the origin. The existence of such a substitution rule implies according to the above theorem that $\Omega-x'$ has boundaries in $Q[\tau]$. Taking my $y \in \Sigma[\Omega]$, the set $\Omega-y'$ has also boundaries in $Q[\tau]$, since x', $y' \in \mathbb{Z}[\tau]$. Consequently, we have the following corollary.

Corollary 5.11. Let $x \in \Sigma[\Omega]$. If there exists a substitution generating the quasicrystal $\Sigma[\Omega]$ from the paint x, then for any $y \in \Sigma[\Omega]$, there exists a substitution generating $\Sigma[\Omega]$ from y.

6. Estimates on the Number of Letters

An upper bound on the number of letters used in the substitution rule can be obtained using the ideas of the proof of Proposition 5.9, by counting the number of splitting points (elements of $\Gamma_1 \cup \Gamma_2$). Let us recall one of the results from [12]. For quasicrystals, whose acceptance widow has the length l, the minimal distance s(l) satisfies $$\frac{1}{\tau}\varepsilon(l) \leq \frac{1}{l} \leq \varepsilon(l).$$

Therefore, a quasicrystal with the length of acceptance window being q(d-c), may contain in the line segments $q(-|c'-\tau|-4\tau, |c'-\tau|)$ and $q(-|d'-1|-4\tau,|d'-1|)$ at most $\lceil g^2(d-c)(2|c'-\tau|+2|d'-1|8\tau) \rceil$ elements.

If c, d belong to $\mathbb{Z}[\tau]$, we can find a more precise bound on the number of letters. For $c \in \mathbb{Z}[\tau]$, all members of the sequence $\tau_j$ are also in $\mathbb{Z}[\tau]$. Recall that $\tau_j$ arises from $\tau_{j-1}$ using the function g. Its action on the quasicrystal side corresponds to walking from $\gamma'_{j-1}$ through quasicrystal Dense to the left, and when we come to a point from Sparse, we divide it by $\tau^2$ to obtain $\gamma'_j$. It follows that if $\gamma'_0$ is positive, then $\gamma'_0 > \gamma'_1 > ... > \gamma'_k = \gamma'_{k+1} = 0$, hence the set $\Gamma_1$ is finite. If $\gamma'_0$ is negative then $y'_0 < y'_1 < ... < \gamma'_k = y'_{k+1} = z$, where z is the left neighbour of 0 in the quasicrystal Dense. Since the maximal distance in Sparse is $\tau^4$ and the minimal distance in Dense is 1, we have the following inequality $$\frac{1}{\tau^2}(\gamma'_{j-1} - \tau^4 + 1) \leq \gamma'_j \leq \frac{1}{\tau^2}\gamma'_{j-1}.$$

By induction, we obtain $$\frac{1}{\tau^{2j}}(c' - \tau) - (\tau^2 + 1) < \gamma'_j \leq \frac{1}{\tau^{2j}}(c' - \tau),$$

which improves the estimation (9). For an index $J = m = \lceil \frac{1}{2} \log_\tau |c'-\tau| \rceil$, we have $-\tau^2 - 2 < \gamma'_m \leq 1$. It can be shown that inside of the interval $(-\tau^2-2, 1]$ there are at most two distinct elements of the sequence $\tau'_j$, $j \geq m$. Similar considerations could be done for the sequence $\delta'_j$. Finally, we have an estimate on the number of splitting points, which determines the number of necessary letters in the alphabet of the substitution generating the quasicrystal.

Remark 6.1. Let c, $d \in \mathbb{Z}[\tau]$. There exists a substitution generating the quasicrystal $\Sigma[c, d]$, with the alphabet $A = (a_1, ..., a_k)$, where k is at most $$\lceil \tfrac{1}{2} \log_\tau |c'-\tau| \rceil + \lceil \tfrac{1}{2} \log_\tau |d'-1| \rceil + 4$$

All quasicrystals $\Sigma[c, d]$ with c, $d \in \mathbb{Z}[\tau]$ are generated by a substitution $\zeta$ with an alphabet $A = \{a_1, ..., a_{k_s}, a_{k_s+1}, ..., a_{k_L}, a_{k_L+1}, ..., a_k\}$, see Definition 5.3. Let us now determine those quasicrystals, for which there exists a three-letter substitution. More precisely, find c, d, such that there exists a positive integer r with the following property; Consider $\omega$: $A \to \{S, L, M\}$, given by $$a_1, ... a_{k_s} | \to S$$
$$a_{k_s+1}, ... a_{k_L} | \to L$$
$$a_{k_L+1}, ... a_k | \to M.$$

Then $$\omega(\zeta'(a_i)) = \zeta'(\omega(a_i)), \text{ for } i=1, ..., k.$$

This implies that $\epsilon = \omega o(\zeta^r)$ is a substitution with three-letter alphabet, generating the quasicrystal $\Sigma[c, d]$. The result is given in the following proposition.

Proposition 6.2. Let c, $d \in \mathbb{Z}[\tau], 1 < d-c < \tau, c \leq 0 < d$. Then there exists a substitution $\xi$ with three-letter alphabet $A = \{S, L, M\}$ generating the quasicrystal $\Sigma[c, d]$, if and only if one of the following cases is true:

(a) c=0; or
(b) c=-1/$\tau$, and d' $\leq$ 1; or
(c) d=1, and c' $\leq \tau$.

Proof. From the construction of substitution rules for quasicrystals, it is clear that r has to be large enough, such that neither the intervals $$\frac{1}{\tau^{2r}}[c, d-1], \frac{1}{\tau^{2r}}\left[d-1, c+\frac{1}{\tau}\right], \frac{1}{\tau^{2r}}\left[c+\frac{1}{\tau}, d\right], \tag{12}$$

nor their images under iterations $f^{(i)}$ of the function f are divided by splitting points $\delta = d-1$, $\gamma_0 = c+1/\tau$. Similarly as in Proposition 5.2, when scaling by $\tau^{2r}$ instead of $\tau^2$, the intervals (12) and their iterations (images under $f^{(i)}$) cover disjaointly the entire acceptance window [c, d). Therefore the splitting points $\delta_0$, $\gamma_0$ must be boundary points of some iterations of some intervals. In other words, points d-1, c+1/$\tau$ are images of c/$\tau^{2r}$, (d-1)/$\tau^{2r}$, (c+1/$\tau$)/$\tau^{2r}$, under some iteration of f. It means that the quasicrystal point (d-1)' arises by filling the stretched tile $\tau^{2r}$S with left end point $\tau^{2r}$c', or the stretched tile $\tau^{2r}$L with left end point $\tau^{2r}$(d-1)', or the stretched file $\tau^{2r}$M with left and point $\tau^{2r}$(c+1/$\tau$)'. Similarly, we want this to be satisfied for the quasicrystal point (c+1/$\tau$)'. This implies that d'-1, c'-r must belong to one of the intervals $\tau^{2r}[c', c'+1)$, $\tau^{2r}[d'-1, d'-1+\tau^2)$, $\tau^{2r}[c'-\tau, c'-\tau+\tau)$.

Note that the first and the last of the intervals can be put together. We can denote $\tau^{2r}I_1:=\tau^{2r}[c'-\tau, c'+1)$, $\tau^{2r}I_2:=\tau^{2r}[d'-1, d'+\tau)$.

Then the necessary and sufficient condition for a substitution ξ to exist may be rewritten as $$(d-1)', (c+1/\tau)' \epsilon \tau^{2r}(I_1 \cup I_2). \quad (13)$$

We shall now distinguish the following three cases: (i) $0 \in I^\circ{}_1 \cup I^\circ{}_2$, (ii) $0 \notin I_1 \cup I_2$, and (iii) $0 \in I_1 \cup I_2$ but $0 \notin I^\circ{}_1 \cup I^\circ{}_2$.

Before let us notice the following fact. We consider acceptance windows [c, d), containing 0, such that $1 < d-c < \tau$. One has $$-\tau < c \leq 0 \Rightarrow -1 < c + \frac{1}{\tau} \leq \frac{1}{\tau} \Rightarrow c' - \tau \in \Sigma\left(-1, \frac{1}{\tau}\right],$$

$$0 < d < \tau \Rightarrow -1 < d - 1 < \frac{1}{\tau} \Rightarrow d' - 1 \in \Sigma\left(-1, \frac{1}{\tau}\right),$$

The quasicrystal $\Sigma[-1, 1/\tau]$ ($\Sigma[-1, 1/\tau)$ resp.) is a uniformly discrete set, see Proposition 3.4, We shall use the fact that its first few points less or equal to zero are $0, -\tau, -\tau^2, -\tau^3$ for $\Sigma[-1, 1/\tau]$, and $0, -\tau^2, -\tau^3$ for $\Sigma[-1, 1/\tau)$. We shall now distinguish the cases.

(i) Suppose that $0 \in I^\circ{}_1 \cup I^\circ{}_2$. Obviously, if one of the intervals $I_1, I^2$ contains 0 in its interior, it is always possible to find sufficiently large r, such that both $d'-1$, and $c'-\tau$ belong to $\tau^{2r}I_i$. By that the condition (13) is satisfied. Let us decide, whether the situation (i) may occur, and what happens, if yes. Let $0 \in I^\circ{}_1$. This means that $c'-\tau < 0 < c'+1$. It follows that $-\tau^2 < c'-\tau < 0$. However, we know also that $c'-\tau$ belongs to the quasicrystal $\Sigma[-1, 1/\tau]$. Together it implies that $c'-\tau = -\tau$, i.e. $0 \in I^\circ{}_1$ only for $c=c'=0$, which is the (a) case of the proposition. Further, let $0 \in I^\circ{}_2$, i.e. $d'-1 < 0 < d'+\tau$. This means that $-\tau^2 < d'-1 < 0$. However, this is not compatible with the condition $d'-1 \in \Sigma[-1, 1/\tau)$. Therefore $0 \notin I^\circ{}_2$ never happens.

(ii) Assume that $0 \notin I_1 \cup I_2$. We show that in this case the condition (13) cannot be satisfied. Our aim is to show that the points $d'-1$ and $c'\tau$ cannot lie within some $\tau^{2r}I_1$ or $\tau^{2r}I_2$. Suppose the opposite. From a geometrical scheme it is obvious that necessarily both $I_1, I_2$ are subsets of the negative half-axis, $I_i \subset (-\infty, 0)$. (Reason: $c'-\tau$ is the left boundary point of $I_1$; $d'-1$ is the left boundary point of $I_2$.) It is again obvious, that if $I_1$ is the interval closer to zero of the two, then its left boundary point has to belong to $\tau^{2r}I_i$. Therefore at least one of the conditions below should be satisfied, $$\tau^{2r}(c'-\tau) \leq c'-\tau < \tau^{2r}(c'+1), \quad (14)$$

$$\tau^{2r}(d'-1) \leq d'-\tau < \tau^{2r}(d'+\tau), \quad (15)$$

Note that the terms on the right hand side of both conditions are strictly smaller than 0, since both $I_1, I_2$ are on the negative half-axis. Together with the fact that both $I_1 \subset (-\infty, 0)$, this implies for the points $c'-\tau$, $d'-1$ that $$-\tau^3 < c' - \tau < -\tau^2,$$

$$-\tau^3 < d' - 1 < -\tau^2.$$

However, within the interval $(-\tau^3, -\tau^2)$ them is no point of the quasicrystal $\Sigma[-1, 1/\tau]$, and therefore if $0 \notin I_1$, and $0 \notin I_2$, then the prime images $d'-1$ and $c'-\tau$ of the splitting points cannot belong to $\tau^{2r}I_i$, (iii) $0 \in I_1 \cup I_2$ but $0 \notin I^\circ{}_1 \cup I^\circ{}_2$. It remains to decide about the result in the case that 0 lies on the boundary of $I_1$, or $I_2$. We shall use the fact, following from the previous considerations in (ii), that if $0 \notin I_1$, then $c'-\tau$ cannot belong to $\tau^{2r}I_1$, and similarly for $0 \notin I_2$, then $d'-1$ cannot belong to $\tau^{2r}I_2$. Let 0 be on the boundary of the interval $I_i$, $i=1, 2$. It happens for $c=-1/\tau$ ($I_1=[0, \tau^2)$), or for $d=1$ ($I_2=[0, \tau^2)$). Suppose at first that $c=-1/\tau$. Then according to the note above, we have $d'-1 \notin \tau^{2r}I_2$. Therefore necessarily $d'-1 \geq 0$. This corresponds to the case (b) of the proposition. Now let 0 be on the boundary of the interval $I_2$, it means $d=1$ ($I_2=[0, \tau^2)$). We have $c'-\tau \notin \tau^{2r}I_1$. Therefore necessarily $c'-\tau \leq 0$. Such conditions give (c) of the proposition.

In the same way, we may determine for which 2-tile quasicrystals, i.e. with the length of the acceptance window $d-c=1$, it is possible to reduce the alphabet of the substitution to two letters only. Without demonstration we present Proposition 6,3. Let $c \in Z[\tau]$, such that $c \leq 0 < c+1$. The alphabet of the substitution ζ for the quasicrystal $\Sigma 8$ c, c+1) may be reduced to two letters if and only if $\Sigma[c, c+1) = \Sigma[-1/\tau^2, 1/\tau)$, $\Sigma[-1/\tau, 1/\tau^2)$, or $\Sigma[0, 1)$.

Let us illustrate the possibility to reduce the alphabet of a substitution. Consider the Example 4.2 of the quasicrystal $\Sigma[0, 1+1/\rho^2)$. Its substitution ζ may be found on FIG. 6. The second iteration of ζ is $$S | \rightarrow SM_2 LM_1$$

$$L | \rightarrow SM_2 LM_1 SM_2 LM_1 SM_2 M_1$$

$$M_1 | \rightarrow SM_2 LM_1 SM_2 M_1$$

$$M_2 | \rightarrow SM_2 LM_1 SM_2 M_1$$

It is obvious that the letters $M_1$ and $M_2$ are substituted by the same sequence of letters and therefore one may identify them. We obtain the substitution with the alphabet {S, L, M}, $$S | \rightarrow SMLM$$

$$L | \rightarrow SMLMSMLMSMM$$

$$M | \rightarrow SMLMSMM$$

7. Types of Acceptance Intervals

In previous sections we have explained how to construct substitution rules for quasicrystals with acceptance windows [c, d), c, d∈Q[τ]. Let us examine, how the presence or absence of boundary points in the acceptance window may influence the substitution rule. If the boundary point $d \in Q[\tau]$ does not belong to the ring $Z[\tau] = \Sigma[c, d]$. Similarly, if $c \in Q[\tau]$, $c \notin Z[\tau]$, we have $\Sigma[c, d) = \Sigma[c, d)$. Thus if at least one of the boundary points of the acceptance interval is not an element of $Z[\tau]$, it is always possible to use the presented method, considering the acceptance window $\Omega=[c, d)$, or n $\Omega=(c, d]$. In both cases, the function from (4) is continuous at least from one side, right continuous, or left continuous, respectively.

If c, d are both elements of the ring $Z[\tau]$, and the given quasicrystal has an open or closed acceptance window ($\Omega=(c, d)$ or $\Omega=[c, d]$), we need a special approach. The discontinuities of the function f in points $c+1/\tau$ and $d-1$ are of different types. These points must be assigned by additional letters. The resulting substitution rule is not primitive. The letters of the alphabet are divided into two groups, $\{a_1, \ldots, a_k\}$, corresponding to interiors of the intervals $\Omega_1$ of the splitting, and $\{b_1, \ldots, b_r\}$, corresponding to splitting points. Note that $r=k+1$ for $\Omega=[c, d]$, and $r=k-1$ for $\Omega=(c, d)$.

Clearly, by the same procedure as for the case of semiclosed intervals, we assign to all letters are words formed only by letters al. Together with words assigned to letters $b_i$, we have a substitution rule with the alphabet $\{a_1, \ldots, a_k\} \cup \{b_1, \ldots b_r\}$. Its matrix has the block form $$P = \begin{pmatrix} P_{11} & 0 \\ P_{21} & P_{22} \end{pmatrix}.$$

Since any power $M^n$ has the same form as $M$, the substitution is not primitive.

Example 7.1. In here, we illustrate the difference between substitution rules for quasicrystals with acceptance windows $[-1/\tau^2, 1)$, $(-1/\tau^2, 1)$, $(-1/\tau^2, 1]$, $[-1/\tau^2, 1]$. Using the algorithm, described in Sections 4 and 5, for the quasicrystal $\Sigma[-1/\tau^2, 1)$, we obtain the following splitting of the acceptance window

| $a_1$ | $a_2$ | $a_3$ | $a_4$ |
|---|---|---|---|
| $-\frac{1}{\tau^2}$ | 0 | $\frac{1}{\tau^3}$ | $\frac{1}{\tau}$ | 1 |

Quasicrystal points x, such that $x' \in [-1/\tau^2, 0)$, are assigned with the letter $a_1$, similarly, $[0, 2/\tau^3) \to a_2$, $[1/\tau^3, 1/\tau) \to a_3$, and $[1/\tau, 1) \to a_4$, as illustrated on the picture. Using this assignment of letters, we have the substitution rule $\zeta$ from Definition 5.3

$$a_1 | \to a_1 a_{4\,1}$$
$$a_2 | \to a_3 a_1 a_4$$
$$a_3 | \to a_2 a_{3\,1}$$
$$a_4 | \to a_3 a_1 a_4 \quad (16)$$

Using the lengths, 1 for $a_1$, $\tau^2$ for $a_2$ and $\tau$ for $a_3$, $a_4$, the quasicrystal $\Sigma[-1/\tau^2, 1)$ corresponds to the fixed point $$\overleftarrow{\zeta^\infty(a_4)} \Big| \overrightarrow{\zeta^\infty(a_2)}.$$

The starting points were chosen according to point 3 of Remark 3.4.

For the acceptance window $(-1/\tau^2, 1]$, the splitting is the same as before. However, the assignment of letters is different: $(-1/\tau^2, 0] \to a_1$, $(0, 1/\tau^3] \to a_2$, $(1/\tau^3, 1/\tau] \to a_3$, and $(1/\tau, 1] \to a_4$. The substitution rule coincides with that of (16). but the starting points have to be chosen differently. The quasicrystal $\Sigma[-1/\tau^2, 1]$ is the fixed point $$\overleftarrow{\zeta^\infty(a_3)} \Big| \overrightarrow{\zeta^\infty(a_1)}.$$

Consider now the open interval $(-1/\tau^2, 1)$. The letters $a_1, \ldots, a_4$ are assigned to the open intervals. For their boundaries, we have to introduce three additional letters $b_1, b_2, b_3$, $0 \to b_1$, $1/\tau^3 \to b_2$, and $1/\tau \to b_3$,

| | $a_1$ | | $a_2$ | | $a_3$ | | $a_4$ | |
|---|---|---|---|---|---|---|---|---|
| ○ | | $b_1$ | | $b_2$ | | $b_3$ | | ○ |
| $-\frac{1}{\tau^2}$ | | 0 | | $\frac{1}{\tau^3}$ | | $\frac{1}{\tau}$ | | 1 |

The substitution rule (16) has to be extended by $$b_1 | \to b_1 a_3 a_1 a_a$$
$$b_2 | \to a_2 a_3 a_1 a_4$$
$$b_3 | \to b_2 b_3 \quad (17)$$

where the words were obtained in a standard way using the function f of (4). If we assign the lengths $\tau^2$ to $b_1$, $b_2$, and $\tau$ to $b_3$, the quasicrystal $\Sigma(-1/\tau^2, 1)$ it the feed point $$\overleftarrow{\zeta^\infty(b_3)} \Big| \overrightarrow{\zeta^\infty(b_1)}$$

of the substitution $\zeta$ given by (16) and (17) with the alphabet $\{a_1, \ldots, a_4, b_1, b_2, b_3\}$.

Finally, let us consider the quasicrystal $\Sigma[-1/\tau^2, 1]$. The boundary points of the intervals are assigned by letters $-1/\tau^2 \to c_1$, $0 \to c_2$, $1/\tau^3 \to c_3$, $1/\tau \to c_4$, and $I \to c_5$,

| $c_1$ | $a_1$ | $c_2$ | $a_2$ | $c_3$ | $a_3$ | $c_4$ | $a_4$ | $c_5$ |
|---|---|---|---|---|---|---|---|---|
| $-\frac{1}{\tau^2}$ | | 0 | | $\frac{1}{\tau^3}$ | | $\frac{1}{\tau}$ | | 1 |

Using the function f we obtain the substitution rule $$c_1 | \to a_1 a_4$$
$$c_2 | \to c_2 c_5$$
$$c_3 | \to a_2 a_3$$
$$c_4 | \to c_3 c_1 c_4$$
$$c_5 | \to a_3 a_1 a_4 \quad (18)$$

which together with (16) gives the fixed point $$\overleftarrow{\zeta^\infty(a_4)} \Big| \overrightarrow{\zeta^\infty(a_2)}.$$

If the length of $c_1$, $c_2$ is 1, and the length of $c_3$, $c_4$, $c_5$ is $\tau$, the later fixed point coincides with the quasicrystal $\Sigma[-1/\tau^2, 1]$.

If all the splitting points have their own letters, we obtain a substitution rule which generates the given quasicrystal. However, in majority of cases, we may reduce the number of elements in the alphabet, if we examine carefully, whether while iterating the function f the boundary point does not behave in the same way as an interval adjacent to it. For example, in the rule given by (16) and (18), generating the quasicrystal $\Sigma[-1/\tau^2, 1]$, one may identify $c_1 \equiv a_1$, $c_3 \equiv a_3$, and $c_5 \equiv a_4$. Then, it suffices to add to (16) the rules $c \to c_2 a_4$, $c_4 \to a_3 a_1 c_4$.

Recall that the substitution process starts with the pair $c_4 | c_2$. From the reduced prescription, it is clear that the letters $c_4$, $c_2$ occur only once in the entire infinite word, namely around the origin, denoted by the delimiter |. It means that the densities of letters $c_2$, $c_4$ in the infinite word vanish. This can be also justified using the substitution matrix of the rule, $$M = \begin{pmatrix} 1 & 0 & 0 & 1 & 0 & 0 \\ 1 & 1 & 1 & 1 & 0 & 0 \\ 0 & 1 & 1 & 0 & 0 & 0 \\ 1 & 0 & 1 & 1 & 0 & 0 \\ 0 & 0 & 0 & 1 & 1 & 0 \\ 1 & 0 & 1 & 0 & 0 & 1 \end{pmatrix}.$$

First, note that the matrix M is decomposable. It means that any of its powers contains zero elements. Such a matrix is not primitive. Both M and $M^T$ have the eigenvalue $\tau^2$, (scaling factor of the quasicrystal). Corresponding eigenvector of $M^T$ has zero components in positions $c_2$, $c_4$. These are the densities of $c_2$, $c_4$ in the fixed point.

8. Conclusion

In this paper we have shown that In addition to the well known Fibonacci chain, there is an infinite family of non equivalent quasicrystals based on the golden mean $\tau$, which may be generated by substitution rules. It is straightforward to generalize the results of the article to the so-called quadratic unitary Pisot numbers. These are the roots of the equation $x^2=mx+1$, m∈N, or $x^2=nx-1$, n≧3, n∈N. Denote by β and β' the two toots of such an equation, β>1|β'|. Similarly as for the golden mean, we have the Galois automorphism β→β', on the field Q[β]. It is possible to define the quasicrystal as a subset of the ring Z[β]:=Z+Zβ, by $$\Sigma(\Omega):=\{x \in Z[\beta] | x' \in \Omega\},$$

where Ω is a bounded interval. It was shown in [13], that such a 1-dimensional quasicrystal is a Delone set in R with at most three different tiles, S, M, L, say. Moreover, the sets $\Sigma_S$, $\Sigma_M$, $\Sigma_L$ of left end points of dies S, M, L, respectively, are quasicrystals with acceptance windows $\Omega_S$, $\Omega_M$, and $\Omega_L$—three disjoint intervals.

Since β is a unitary Pisot number, we have $\beta^2 Z[\beta]=Z[\beta]$. Similarly as for τ, this property is used for construction of substitutions. Walking by quasicrystal points step by step may be described in terms of iterations of the function f analogous to the one of (4). Hence, it is possible to generalize the whole construction procedure for any quadratic unitary Pisot number β.

References

1. J. P. Alouche, M. Mendés France, Automata and automate sequences, in *Beyond Quasicrystals*, eds. F. Axel and D. Gratias, Les Editions des Physique & Springer (1995), 293–367
2. M. Baake, R. V. Moody, Similarly submodules and semigroups, in *Quasicrystals and Discrete Geometry*, vol. 10, ed. J. Patera, Fields Institute monographs, AMS, (1998) 1–14
3. M. Baake, R. V. Moody, M. Schlottman, Limit-(quasi-) periodic point sets as quasicrystals with p-adi internal spaces, J. Phys. A:math. Gen. 31 (1998) 5955–5765
4. S. Berman and R. V Moody, The algebraic theory of quasicrystals with five fold symmetry, J. Phys. A: Math. Gen. 27(1994)566–584. (115–130)
5. E. Bombieri, J. E. Taylor. Quasicrystals, tilings, and algebraic number theory; some preliminary connections, Contemp. Math., 64, Amer. Math. Sec., Providence, R.I., (1987) 241–264
6. C. Burdrik, Ch. Frougny, J. P.; Gazeau, R. Krejcar Beta-Integers as Natural Counting Systems for Quasicrystals, J. Phys. A: Math, Gen. 31 (1998).
7. J. W. Cahn, J. E. Taylor, An introduction to quasicrystals, Contemp. Math., 64, Amer. Math. Soc. Providence, R.I., (1987) 265–286
8. Gähler, R. Klitzing, The diffraction pattern of self-similar tilings, in *Mathematics of Long Range Aperiodic Order*, Proc. NATO ASI, Waterloo, 1996, ed. R. V. Moody, Kluwer (1996) 141–174
9. B. Grünbaum, G. C. Shepherd, *Tilings and patterns*, W. H. Freeman, New York, 1986
10. A. Hof, On diffraction by aperiodic structures, Comm. Math. Phys., 169 (1995) 25–43.
11. Z. Masákova, J. Patera, and E. Pelantová, Inflation center of the cut and project quasicrystals, J. Phys. A: Math, Gen. 31 (1998) 1443–1453
12. Z. Masákova, J. Patera, and E. Pelantová, Minimal distances in quasicrystals, J. Phys. A: Math. Gen. 31 (1998) 1539–1552
13. Z Masákova, J. Patera, E, Pelantová, Quadratic irrationalities and geometric properties of one-dimensional quasicrystals, CRM-2565. Université de Montréal (1998)
14. R. V. Moody, J. Patera, Quasicrystals and iconsians, J. Phys. A: Math. Gen., 26 (1993) 2829–2853,
15. R. Penrose, Pentaplexity: a class of nonperiodic tilings of the plane, Math. Intell 2,32–37 (1979)
16. M, Queffélec, Spectral study of automatic and substitutive sequences, in *Beyond Quasicrystals*, eds. F. Axel and D. Gratias, Les Editions des Physique & Springer (1995), 369–414
17. M. Senechal, Quasicrystals and geometry, Cambridge Univ. Press, Cambridge, UK 1995.
18. B. Solomyak, Dynamics of self-similar tilings, Ergodic Theory Dynam. Systems 17 (1997), no. 3, 695–738.

What is claimed is:

1. A method of encrypting data comprising:
   a) defining symmetric key parameters specifying at least one quasi-crystal function and a starting point;
   b) calculating consecutive aperiodic values of said function;
   c) using said aperiodic values of said function in a predetermined process of generating a series of encryption pad values, said predetermined process being defined by said key parameters; and
   d) encrypting said data using said pad values.

2. The method as claimed in claim 1, wherein said step of calculating comprises using numerical functions having a fixed precision and predetermined numerical error characteristics, whereby exact duplication of said consecutive aperiodic values with said fixed precision and predetermined numerical error characteristics is possible during decryption.

3. The method as claimed in claim 1, wherein said quasi-crystal function is a one-dimensional quasi-crystal using a quadratic irrationality, said key parameters defining an acceptance window for said quasi-crystal.

4. The method as claimed in claim 3, wherein the quadratic irrationality is given by the solution of $x^2=x+1$.

5. The method as claimed in claim 4, further comprising: transforming said acceptance window of said quasicrystal when values of said quasicrystal function are sufficiently large to warrant transformation.

6. The method as claimed in claim 3, further comprising: transforming an acceptance window of said quasicrystal when values of said quasi-crystal function are sufficiently large to warrant transforming.

7. The method as claimed in claim 1, wherein said predetermined process of generating a series of encryption pad values comprises calculating a color from each point of said quasi-crystal, said pad values being determined by said color.

8. The method as claimed in claim 7, wherein said color is calculated from a non-linear function of said quasi-crystal points.

9. The method as claimed in claim 1, wherein said at least one quasi-crystal function comprises three quasi-crystal functions, a first one of said functions being used to control switching use between a second and a third one of said functions, which second and third ones of said functions are used to calculate said aperiodic values.

10. The method as claimed in claim 1, wherein said quasi-crystal function is a symbolic sequence substitution function, and said calculating consecutive values of said quasi-crystal function involves carrying out substitution to grow said symbolic sequence and determining said consecutive &periodic values from said sequence.

11. The method as claimed in claim 10, further comprising:
shifting said sequence when a length of said sequence becomes sufficiently large to warrant a reduction in memory usage for representing said sequence.

12. The method as claimed in claim 10, wherein said sequence substitution function Is calculated from selected starting point and acceptance window parameters.

13. The method as claimed in claim 11, wherein said sequence substitution function is calculated from selected starting point and acceptance window parameters.

14. A method of securely transmitting data comprising:
a) defining symmetric key parameters specifying at least one quasi-crystal function and a starting point;
b) sharing said symmetric key parameters between a sender and a receiver over a secure channel;
c) calculating consecutive aperiodic values of said function at both a sender end and a receiver end;
d) using said aperiodic values of said function In a predetermined process of generating a series of encryption pad values at said sender end and of decryption pad values at said receiver end, said predetermined process being defined by said key parameters;
e) encrypting said data using said encryption pad values;
f) transmitting said encrypted data over an unsecure channel from said sender to said receiver;
g) decrypting said transmitted data using decryption pad values.

15. The method as claimed in claim 14, wherein said step of calculating comprises using numerical functions having a fixed precision and predetermined numerical error characteristics at both said sender and said receiver ends, whereby exact duplication of said consecutive aperiodic values with said fixed precision and predetermined numerical error characteristics is possible.

16. The method as claimed in claim 14, wherein said quasi-crystal function is a one-dimensional quasi-crystal using a quadratic irrationality, said key parameters defining an acceptance window for said quasi-crystal.

17. The method as claimed in claim 16, further comprising:
transforming said acceptance window of said quasi-crystal when values of said quasi-crystal function are sufficiently large to warrant transformation.

18. The method as claimed in claim 17, wherein said quadratic irrationality is given by the solution of x=x+1.

19. The method as claimed in claim 15, further comprising:
translating an acceptance window of said quasi-crystal when values of said quasi-crystal function are sufficiently large to warrant rescaling.

20. The method as claimed in claim 14, wherein said predetermined process of generating a series of pad values comprises calculating a color from each point of said quasi-crystal, said pad values being determined by said color.

21. The method as claimed in claim 20, wherein said color is calculated from a non-linear function of said quasi-crystal points.

22. The method as claimed in claim 14, wherein said at least one quasi-crystal function comprises three quasi-crystal functions, a first one of said functions being used to control switching use between a second and a third one of said functions, which second and third ones of said functions are used to calculate said aperiodic values.

23. The method as claimed in claim 14, wherein said quasi-crystal function is a symbolic sequence substitution function, and said calculating consecutive values of said quasicrystal function involves carrying out substitution to grow said symbolic sequence and determining said consecutive aperiodic values from said sequence.

24. The method as claimed in claim 23, further comprising:
shifting said sequence when a length of said sequence becomes sufficiently large to warrant a reduction in memory usage for representing said sequence.

25. The method as claimed in claim 24, wherein said sequence substitution function is calculated from selected starting point and acceptance window parameters.

26. The method as claimed in claim 14, wherein said encryption pad values are the same as said decryption pad values, said encryption Involving an XOR operation of said pad values with said date.

27. A method of decrypting data comprising:
a) receiving information defining symmetric key parameters specifying at least one quasi-crystal function and a starting point;
b) calculating consecutive aperiodic values of said function;
c) using said aperiodic values of said function in a predetermined process of generating a series of encryption pad values, said predetermined process being defined by said key parameters; and
d) decrypting said data using said pad values.

28. A method of applying a digital watermark to a selected portion of a document, the selected portion being modifiable without being easily detected, the method comprising:
applying a quasi-crystal transformation to the selected portion of the document;
applying a watermark to the transformed selected portion; and
applying an inverse quasi-crystal transformation to the watermarked selected portion.

29. The method as claimed in claim 28, wherein the quasi-crystal transformation is a two-dimensional transformation.

30. The method as claimed in claim 29, wherein the watermark applied to the transformed selected portion comprises a visually identifiable mark.

* * * * *